United States Patent [19]
Zehavi et al.

[11] Patent Number: 6,005,855
[45] Date of Patent: *Dec. 21, 1999

[54] METHOD AND APPARATUS FOR PROVIDING VARIABLE RATE DATA IN A COMMUNICATIONS SYSTEM USING STATISTICAL MULTIPLEXING

[75] Inventors: Ephraim Zehavi, Haifa, Israel; Jack K. Wolf, La Jolla; Leonard N. Schiff, San Diego, both of Calif.

[73] Assignee: Qualcomm Incorporated, San Diego, Calif.

[ * ] Notice: This patent is subject to a terminal disclaimer.

[21] Appl. No.: 08/957,486

[22] Filed: Oct. 24, 1997

Related U.S. Application Data

[63] Continuation of application No. 08/431,180, Apr. 28, 1995, abandoned.

[51] Int. Cl.[6] .................................................. H04J 13/04
[52] U.S. Cl. ......................... 370/335; 370/342; 370/468; 714/748
[58] Field of Search ................................ 370/320, 335, 370/342, 441, 468, 206; 375/200, 206; 714/746, 748

[56] References Cited

U.S. PATENT DOCUMENTS

| | | | |
|---|---|---|---|
| 4,135,059 | 1/1979 | Schmidt | 179/15 BS |
| 4,220,821 | 9/1980 | Lucas | 370/110 |
| 4,256,925 | 3/1981 | Gooke | 370/104 |
| 4,291,406 | 9/1981 | Bahl et al. | 371/44 |
| 4,298,979 | 11/1981 | Dobyns et al. | 370/104 |
| 4,319,353 | 3/1982 | Alvarez, III et al. | 370/104 |
| 4,322,845 | 3/1982 | Fennel, Jr. et al. | 370/104 |
| 4,339,818 | 7/1982 | Gruenberg | 370/112 |
| 4,369,434 | 1/1983 | Mueller | 340/347 DD |
| 4,373,151 | 2/1983 | Houdard et al. | 329/104 |
| 4,383,315 | 5/1983 | Torng | 370/89 |
| 4,424,417 | 1/1984 | Chavey et al. | 179/2 E |
| 4,445,213 | 4/1984 | Baugh et al. | 370/94 |
| 4,455,649 | 6/1984 | Esteban et al. | 370/80 |
| 4,491,947 | 1/1985 | Frank | 370/94 |
| 4,494,232 | 1/1985 | Dambrackas et al. | 370/80 |
| 4,547,880 | 10/1985 | De Vita et al. | 370/91 |
| 4,562,572 | 12/1985 | Goldman et al. | 370/80 |
| 4,587,652 | 5/1986 | Goldman | 370/110.1 |
| 4,594,476 | 6/1986 | Freeman | 179/6.08 |
| 4,726,014 | 2/1988 | Goldman et al. | 370/58 |
| 4,839,892 | 6/1989 | Sasaki | 370/95 |
| 4,870,642 | 9/1989 | Nohara et al. | 370/75 |
| 4,876,698 | 10/1989 | Boisson et al. | 375/25 |
| 4,899,337 | 2/1990 | Hirai | 370/80 |
| 4,930,118 | 5/1990 | Sugihara | 370/16 |
| 4,965,796 | 10/1990 | Petty | 370/112 |
| 4,970,648 | 11/1990 | Capots | 364/424.06 |
| 5,003,534 | 3/1991 | Gerhardt et al. | 370/94.1 |
| 5,107,377 | 4/1992 | Ballard | 360/40 |
| 5,121,383 | 6/1992 | Golestani | 370/60 |
| 5,168,575 | 12/1992 | Cizek et al. | 455/33.1 |
| 5,172,375 | 12/1992 | Kou | 370/95.3 |
| 5,179,549 | 1/1993 | Joos et al. | 370/17 |

(List continued on next page.)

*Primary Examiner*—Douglas W. Olms
*Assistant Examiner*—Seema S. Rao
*Attorney, Agent, or Firm*—Russell B. Miller; Sean English; Gregory D. Ogrod

[57] ABSTRACT

A variable rate transmission system wherein a packet of variable rate data generated by a variable rate data source is modulated on traffic channel by traffic channel modulator if the capacity of the traffic channel is capable of transmitting the packet. And where the packet of variable rate data is modulated onto traffic channel by traffic channel modulator and at least one overflow channel by traffic channel modulator, if the capacity of the traffic channel is less than required to transmit the packet. A receiving system for receiving variable rate data transmitted in accordance with the above.

29 Claims, 7 Drawing Sheets

U.S. PATENT DOCUMENTS

| | | | |
|---|---|---|---|
| 5,212,687 | 5/1993 | De La Bourdonnaye | 370/84 |
| 5,216,503 | 6/1993 | Paik et al. | 358/133 |
| 5,276,730 | 1/1994 | Cimini, Jr. et al. | 379/60 |
| 5,280,537 | 1/1994 | Sugiyama et al. | 370/18 |
| 5,293,640 | 3/1994 | Gunmar et al. | 455/33.1 |
| 5,305,308 | 4/1994 | English et al. | 370/32.1 |
| 5,349,580 | 9/1994 | Hester et al. | 370/84 |
| 5,351,240 | 9/1994 | Highsmith | 370/84 |
| 5,373,502 | 12/1994 | Turban | 370/18 |
| 5,400,328 | 3/1995 | Burren et al. | 370/79 |
| 5,420,861 | 5/1995 | De La Bourdonnaye | 370/84 |
| 5,440,452 | 8/1995 | Procter et al. | 370/18 |
| 5,442,625 | 8/1995 | Gitlin et al. | 370/84 |

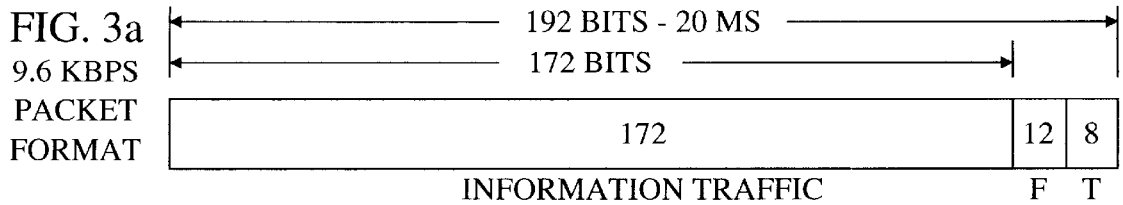
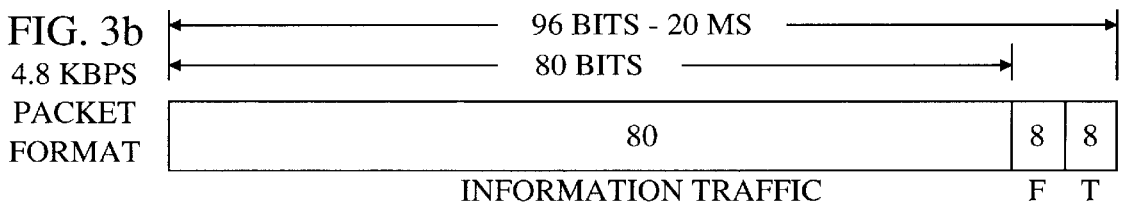
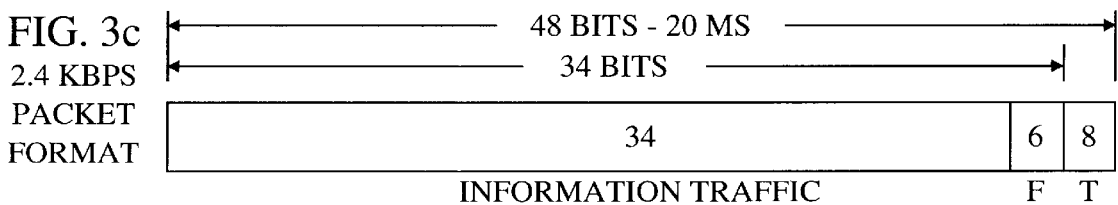
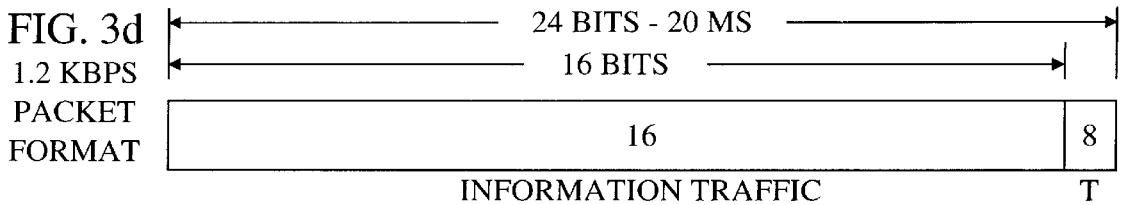

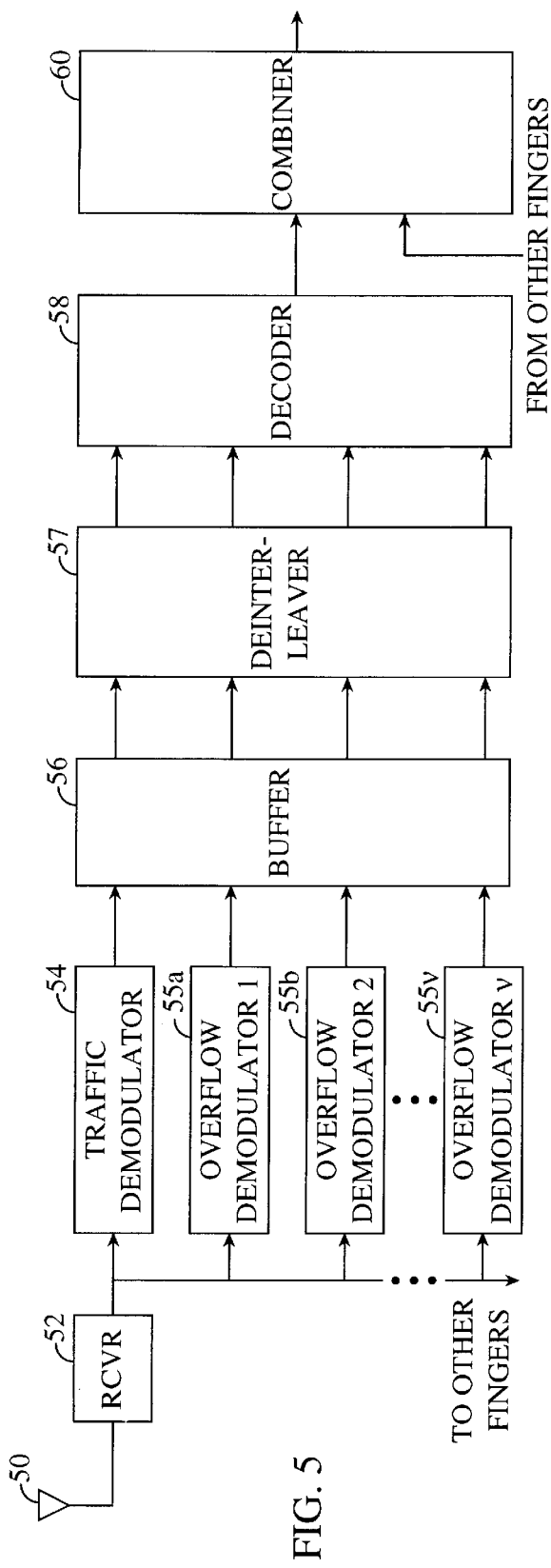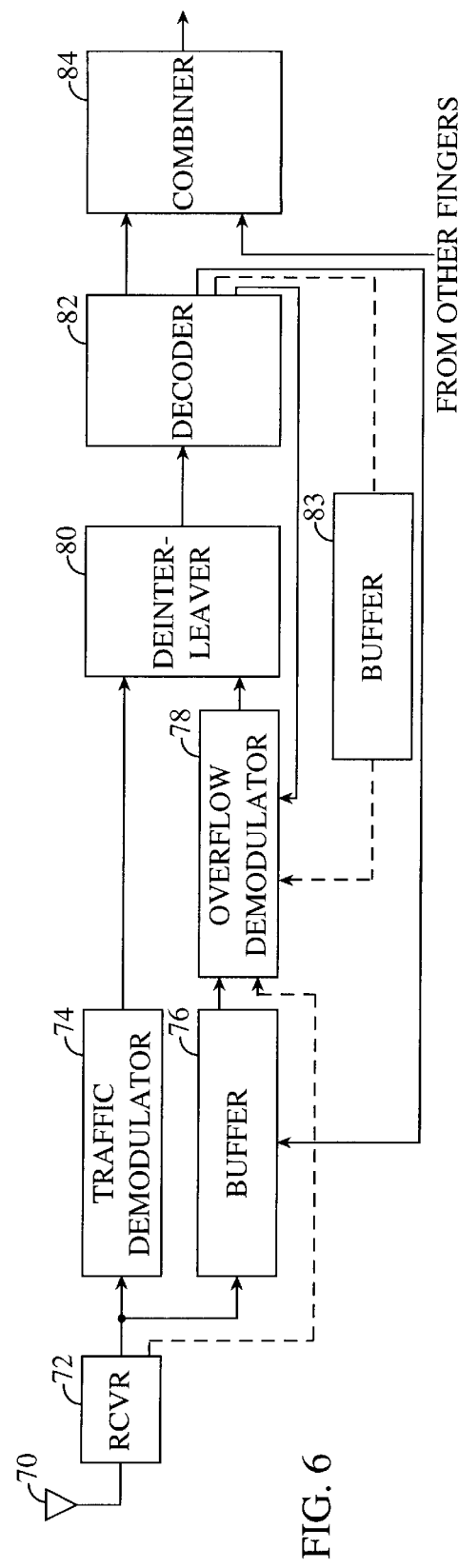

METHOD AND APPARATUS FOR PROVIDING VARIABLE RATE DATA IN A COMMUNICATIONS SYSTEM USING STATISTICAL MULTIPLEXING

This is a continuation of application Ser. No. 08/431,180, filed Apr. 28, 1995, now abandoned.

BACKGROUND OF THE INVENTION

I. Field of the Invention

The present invention relates to communications. More particularly, the present invention relates to a novel and improved communication system wherein a user transmits variable rate data on an allocated traffic channel, however, when the user's transmission exceeds the capacity of the allocated traffic channel, the user is provided temporary use of an overflow channel for use in conjunction with the allocated traffic channel.

II. Description of the Related Art

The present invention is concerned with multiple users utilizing a communications resource such as a satellite transponder. Specifically we are concerned with making the allocation of the communications resource more efficient. The problem, in the context of a satellite transponder, is to efficiently allocate portions of the transponder's fixed communications resource to a large number of users who seek to communicate digital information to each other at a variety of bit rates and duty cycles.

The use of code division multiple access (CDMA) modulation techniques is one of several techniques for facilitating communications in which a large number of system users are present. Other multiple access communication system techniques, such as time division multiple access (TDMA), frequency division multiple access (FDMA) and AM modulation schemes such as amplitude companded single sideband (ACSSB) are known in the art. However, the spread spectrum modulation technique of CDMA has significant advantages over these modulation techniques for multiple access communication systems. The use of CDMA techniques in a multiple access communication system is disclosed in U.S. Pat. No. 4,901,307, entitled "SPREAD SPECTRUM MULTIPLE ACCESS COMMUNICATION SYSTEM USING SATELLITE OR TERRESTRIAL REPEATERS", assigned to the assignee of the present invention and incorporated by reference herein. The use of CDMA techniques in a multiple access communication system is further disclosed in U.S. Pat. No. 5,103,459, entitled "SYSTEM AND METHOD FOR GENERATING SIGNAL WAVEFORMS IN A CDMA CELLULAR TELEPHONE SYSTEM", assigned to the assignee of the present invention and incorporated by reference herein.

CDMA by its inherent nature of being a wideband signal offers a form of frequency diversity by spreading the signal energy over a wide bandwidth. Therefore, frequency selective fading affects only a small part of the CDMA signal bandwidth. Space or path diversity is obtained by providing multiple signal paths through simultaneous links from a mobile user through two or more cell-sites. Furthermore, path diversity may be obtained by exploiting the multipath environment through spread spectrum processing by allowing a signal arriving with different propagation delays to be received and processed separately. Examples of the utilization of path diversity are illustrated in copending U.S. Pat. No. 5,101,501 entitled "SOFT HANDOFF IN A CDMA CELLULAR TELEPHONE SYSTEM", and U.S. Pat. No. 5,109,390 entitled "DIVERSITY RECEIVER IN A CDMA CELLULAR TELEPHONE SYSTEM", both assigned to the assignee of the present invention and incorporated by reference herein.

An additional technique that may be used to increase the efficiency of the allocation of the communication resource is to allow the users of the resource to provide data at varying rates thereby using only the minimum amount of the communication resource to meet their service needs. An example of variable rate data source is a variable rate vocoder which is detailed in U.S. patent application Ser. No. 08/004,484 which is a continuation application of U.S. patent application Ser. No. 07/713,661, now abandoned, entitled "VARIABLE RATE VOCODER," assigned to the assignee of the present invention and incorporated herein by reference. Since speech inherently contains periods of silence, i.e. pauses, the amount of data required to represent these periods can be reduced. Variable rate vocoding most effectively exploits this fact by reducing the data rate for these silent periods.

In a variable rate vocoder of the type described in the aforementioned U.S. patent application Ser. No. 08/004,484, now U.S. Pat. No. 5,414,796 approximately 40% of the speech packets are coded at full rate. In the vocoder described in the patent application, the encoding rate is selected in accordance with the packet energy. When the packet energy exceeds a full rate threshold the speech is coded at full rate. In U.S. patent application Ser. No. 08/288,413, now U.S. Pat. No. 5,742,734 entitled "METHOD AND APPARATUS FOR SELECTING AN ENCODING RATE IN A VARIABLE RATE VOCODER," assigned to the assignee of the present invention and incorporated herein by reference, a method for reducing the number of full rate packets with a minimum of sacrificed quality is disclosed.

A variable rate speech encoder provides speech data at full rate when the talker is actively speaking, thus using the full capacity of the transmission packets. When a variable rate speech coder is providing speech data at a less that maximum rate, there is excess capacity in the transmission packets. A method for transmitting additional data in transmission packets of a fixed size, wherein the source of the data for the data packets is providing the data at a variable rate is described in detail in copending U.S. patent application Ser. No. 08/171,146, U.S. Pat. No. 5,504,773, which is a continuation application of U.S. patent application Ser. No. 07/822,164, filed now abandoned entitled "METHOD AND APPARATUS FOR THE FORMATTING OF DATA FOR TRANSMISSION", assigned to the assignee of the present invention and incorporated by reference herein. In the above mentioned patent application a method and apparatus is disclosed for combining data of differing types from different sources in a data packet for transmission.

SUMMARY OF THE INVENTION

A communications resource is typically divided into communications channels. Typically, for simplicity, each of these channels has the same capacity. It is possible for a communications system to reallocate the channels to the users for each packet to be transmitted. This would theoretically allow for a maximally efficient allocation of the communication resource. However, this technique would result in unacceptable complexity in the resulting receiver and transmitter design.

In the present invention, an efficient method of transmitting and receiving variable rate data is disclosed. In the present invention, each user is provided with an allocated voice or data channel, also referred to as a traffic channel. In addition, each user is provided with selective access to a pool of voice or data channels, referred to as overflow channels which are shared by all users of the communications resource.

When the rate of a user's transmission exceeds the capacity of the allocated traffic channel, the communication system determines whether an overflow channel is available for use by the user. If an overflow channel is available it is temporarily assigned to the user for transmission. The methods presented in the exemplary embodiments describe the cases where a user uses at most the allocated traffic channel and a single overflow channel. However, the methods described herein are easily extendible to cases where a user may require more than one overflow channel in addition to the allocated traffic channel.

The method of the present invention for the assignment of overflow channels to users is based on a concept referred to as statistical multiplexing. In the general case of statistical multiplexing any overflow channel in the common pool of overflow channels can be assigned to any user. In an alternative overflow channel assignment strategy, each user is limited to using a subset of the overflow channels. By reducing the number of possible overflow channels, the design of the receiver may be simplified.

Overflow channel assignment information identifies to a receiver which of the possible overflow channels, if any, will carry information relevant to that receiver for that packet. The present invention describes two classes of techniques for conveying overflow channel assignment information to a receiver. In one method the overflow channel assignment information is provided explicitly. In an explicit overflow channel assignment implementation the overflow channel assignment information is conveyed to the receiver as part of the message packets that are transmitted over the traffic channel or alternatively on a separate channel used for signaling. The explicit overflow channel assignment information may pertain to the current packet or it may pertain to a forthcoming packet. The benefit of sending the overflow channel information prospectively is to reduce the amount of buffering necessary in the receiver. This is achieved at the expense of additional buffering in the transmitter.

The other method of providing the overflow channel assignment information is implicitly. In implicit channel assignment techniques, the overflow channel assignment information is not provided as part of the message packets that are transmitted over the traffic channel nor is the information provided on a separate channel. In an implicit overflow channel assignment implementation the receiver tests all possible overflow channels and determines if one of the overflow channels contains data for its use. This can be achieved by encoding receiver identification information in the overflow packet or by the combination of the traffic packet and the corresponding overflow packet being linked to one another in a way that the receiver can detect.

It is further an objective of the present invention to detail the design of balanced pre-assignment tables. Pre-assignment tables set forth which overflow channels can be used for transmissions of information to which receivers. The idea behind balanced pre-assignment tables is to make the probability of finding an available overflow channel for transmission to all receivers the same. It is another objective of the present invention to describe a method for accomplishing post-assignment consistent with a pre-assignment table. Post assignment is the method of actually assigning the overflow channels for transmission. It is an advantage of the present invention that the methods of the present invention can be tailored to the user's needs in terms of capacity and blockage probability. Disclosed are methods for determining the number of necessary overflow channels required given a maximum acceptable blocking probability and the probability that an overflow channel will be required for transmission of a particular packet.

BRIEF DESCRIPTION OF THE DRAWINGS

The features, objects, and advantages of the present invention will become more apparent from the detailed description set forth below when taken in conjunction with the drawings in which like reference characters identify correspondingly throughout and wherein:

FIG. 3a–3d is an illustration of exemplary transmission packet structures of the exemplary embodiment;

FIG. 5 is a block diagram of a receiver system for the reception of data with implicit overflow channel assignment where the overflow data is encoded together with the traffic data;

FIG. 6 is a block diagram of a receiver system for the reception of data with explicit overflow channel assignment where the overflow data is encoded together with the traffic data;

DETAILED DESCRIPTION OF THE PREFERRED EMBODIMENTS

A multiple access communication resource is divided into channels. This division is usually called multiplexing, three specific types being: frequency division multiplexing (FDM), time division multiplexing (TDM), and code division multiplexing (CDM). The basic unit of information transmitted and received in a communication system is referred to as a packet.

Figure 1:
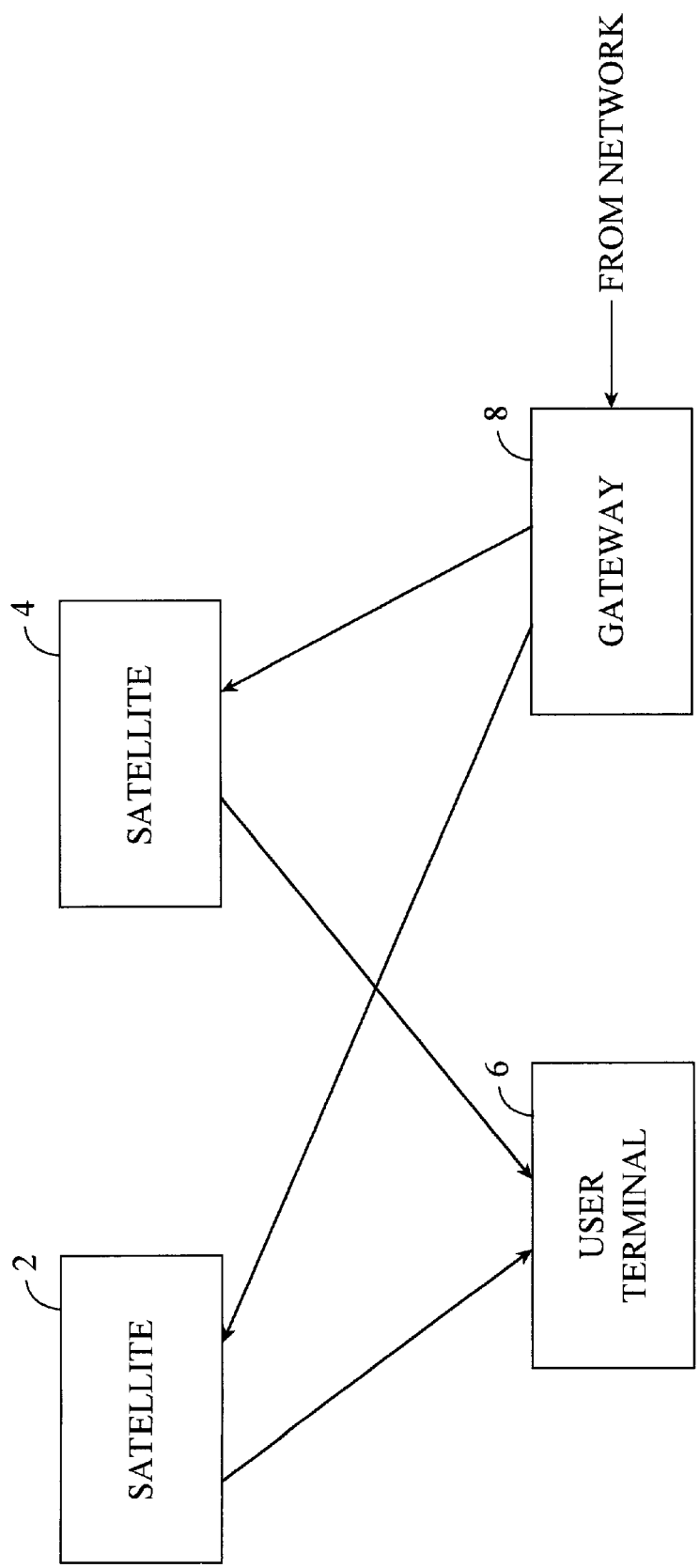
FIG. 1 is a diagram illustrating an exemplary implementation of the present invention in a satellite communication system.

Referring now to the figures, FIG. 1 illustrates an exemplary implementation of the present invention in a satellite communication system such as the Globalstar™ low orbit satellite system. It should be understood however that the present invention may be utilized in a terrestrial based system such as where base stations are used to communicate with remote stations. In FIG. 1, the present invention is used for the downlink communication of information to a remote user station or terminal 2 from gateway 8 via satellites 4 and 6 which may be either geosynchronous or low earth orbit (LEO) types. It should be noted that though the exemplary implementation illustrates communication between two satellites and a user terminal, the present invention is equally applicable for communication from two separate beams of the same satellite and a user terminal. User terminal 2 may be a mobile station such as a portable telephone or other portable or mobile communications device or user terminal 2 may be a fixed communications devices such as a wireless local loop terminal or a central communications center such as a cellular base station. Although only two satellites, a single user terminal and a single gateway are shown in FIG. 1 for ease in illustration, a typical system may contain a plurality of all.

In the exemplary embodiment, satellites 4 and 6 are transponders or non-regenerative repeaters which are typically of the type that simply amplify, change in frequency and re-transmit the signal received from gateway 8. The present invention is equally applicable to cases where satellites 4 and 6 are regenerative repeaters that demodulate and reconstitute the signal prior to re-transmission. In the exemplary embodiment, the signal transmitted by satellites 4 and 6 to user terminal 2 and the signal transmitted from gateway 8 to satellites 4 and 6 are spread spectrum signals. The generation of spread spectrum communication signals is described in detail in the aforementioned U.S. Pat. Nos. 4,901,307 and 5,103,459.

Gateway 8 serves as an interface from a communication network to satellites 4 and 6, or directly to a terrestrial base station (a configuration not shown). Gateway 8 is typically a central communications center that receives data via a network (not shown) which includes public switching telephone networks (PSTN) and networks specifically designed for the communications of the present invention. Gateway 8 may be connected to the network (not shown) by wireline communications or by means of an air interface.

In the exemplary embodiment, gateway 8 transmits variable rate data to user terminal 2. A variable rate data communication system information, the rate of which varies with time. An implementation of a variable rate spread spectrum communication system is described in the aforementioned U.S. Pat. No. 5,103,459. The exemplary embodiment, as in the system described in U.S. Pat. No. 5,103,459, the communications resource is divided into different channels in code space, and where each of the channels has the same information carrying capacity. The difference between the communication system of the present invention and the system described in U.S. Pat. No. 5,103,459 is that in the system described in the U.S. Pat. No. 5,103,459 each channel is independently capable of carrying information at all possible rates whereas in the present invention each channel can independently carry information at a subset of the possibilities In the exemplary embodiment gateway 8 communicates to user terminal 2 at one of four different information data rates. It should be noted that the methods described herein are equally applicable to variable rate communication system that provides for any number of rates. The data rates of the present invention are referred to as eighth rate, quarter rate, half rate and full rate. Full rate transmits approximately twice the information per unit time as half rate, half rate transmits approximately twice the information per unit time as quarter rate and quarter rate transmits approximately twice the information per unit time as eighth rate. The relations between the information rates is approximate owing to the inclusion of overhead bits in a packet. In the exemplary embodiment, a traffic channel has adequate capacity to carry a data packet of all rates except full rate which requires a traffic channel plus an overflow channel. Full rate packets are divided into halves with a first half transmitted on a traffic channel and a second half transmitted on an overflow channel.

The present invention is easily extendible to cases where there are more or less than four rates, or where the highest rate requires more than two channels. Also, it is envisioned that the communications system of the present invention will communicate both fixed rate data and variable rate data. In the communication of fixed rate data, a channel or set of channels is allocated for specific use by that user for the duration of the service being provided.

It is possible that the communication system may use all channels in the communication resource as a general pool for all users. In this type of system no channel is allocated to a specific user, and before the transmission of each packet the communication system would allocate the entire communication resource for transmission. Though this system may arguably result in a maximally efficient allocation of the resource, it results in an unacceptable level of complexity in both receivers and transmitters.

In the exemplary embodiment, the channels are divided into traffic channels and overflow channels. The number of channels in each group may vary with system usage, link parameters or other factors. The first group of channels is the traffic channel group. Each user currently communicating on the communication system is allocated a traffic channel or set of traffic channels specifically for his use for the duration of service. The second group of channels is the overflow channel group. This group of channels is shared by all users of the communications system. The overflow channels are assigned on an as needed basis and are re-assigned at regular intervals. In the exemplary embodiment the overflow channels are re-assigned for each packet interval. A packet interval is the time interval between transmissions of consecutive data packets.

In a preferred embodiment, the overflow channels are assigned by considering all of the full rate packets that are to be transmitted in a given packet interval. In an alternative embodiment, the overflow channels could be assigned individually on a first to request basis or in accordance with a set distribution order. Furthermore, the set of overflow channels available to be used with one traffic channel can be different from the overflow channels that can be used with other traffic channels. In the exemplary embodiment, the number of overflow channels available for any traffic channel is fixed, but this number may be allowed to vary with time in accordance with factors like those enumerated above that influence the division of total channels between those used as traffic channels and those used as overflow channels.

Figure 2:
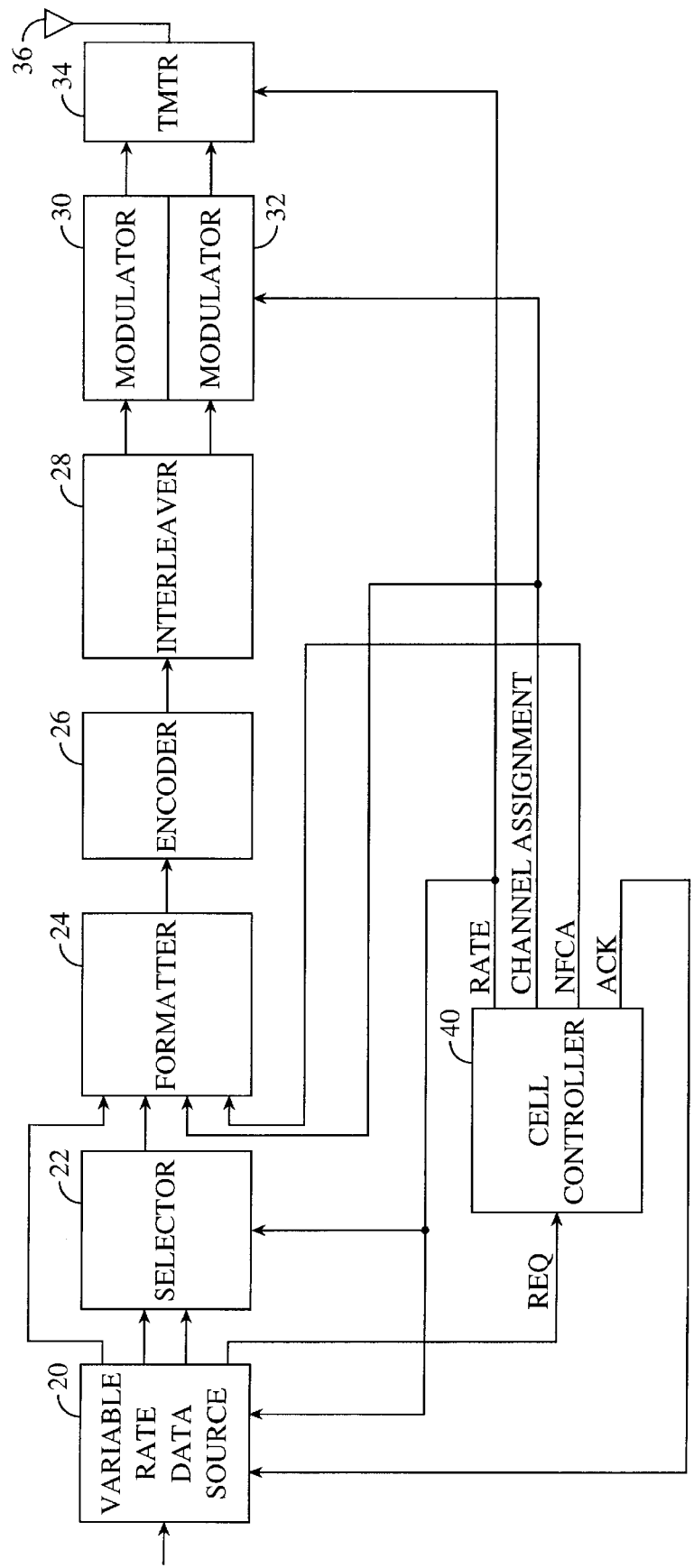
FIG. 2 is a block diagram of the transmission system of the present invention.

FIG. 2 illustrates the transmission system of the present invention. In the first exemplary embodiment of the transmission system of the present invention, when a packet for transmission is a full rate packet, traffic channel portion of the data packet and an overflow channel portion of the data packet are encoded together and the overflow channel assignment data is provided implicitly. As described previously, in an implicit overflow channel assignment implementation, the channel assignment information is not transmitted to the receiver. Instead the receiver demodulates and decodes information on its allocated traffic channel and information on all possible overflow channels and determines whether any of the information provided on the overflow channels is a second portion of a packet sent on the traffic channel.

Input data for transmission is provided to variable rate data source 20 which encodes the input data. Variable rate data source may encode the data so that it is more robust to transmission errors, or it may compress the data so that the transmission of the data requires less of the communication resource for transmission or some combination of the two. In the exemplary embodiment, variable rate data source 20 provides data at four different rates referred to as full rate, half rate, quarter rate and eighth rate. As stated before, the present invention is equally applicable for data sources that provide data at any number of rates. In the exemplary embodiment, full rate information is provided at 8.6 kbps in packets of 172 bits, half rate information is provided at 4 kbps in packets of 80 bits, quarter rate information is provided at 1.7 kbps in packets of 34 bits, and eighth rate information is provided at 800 bps in packets of 16 bits.

Table 1 below illustrates the numerology used in the exemplary embodiment of the present invention.

TABLE 1

Exemplary numerology of the present invention.

| Parameter | | | | | Units |
|---|---|---|---|---|---|
| Data Rate | 9600 | 4800 | 2400 | 1200 | bps |
| PN Chip Rate | 1.238 | 1.238 | 1.238 | 1.238 | Mcps |
| Code Rate | ½ | ½ | ½ | ½ | bits/code symbol |
| Code Repetition | 1 | 1 | 2 | 4 | mod sym/code sym |
| # of Channels | 2 | 1 | 1 | 1 | |
| Modulation | BPSK | BPSK | BPSK | BPSK | |

The present invention is equally applicable to other numerologies. The number of bits specified as the data rates differs from the information rates due to the inclusion of overhead bits into the packet. A detailed description of these additional bits is described later herein.

The exemplary embodiment of variable rate data source 20 is a variable rate vocoder as described in the aforementioned U.S. patent application Ser. No. 08/004,484, now U.S. Pat. No. 5,414,796. In this case, the input to the data source 20 is a packet of speech samples and the output of data source 20 is a packet containing a compressed representation of the speech samples. In the exemplary embodiment of a variable rate vocoder, the energy of a packet of speech samples is measured and compared to a predetermined set of threshold values which determine the encoding rate. Generally if the packet of speech samples contains active speech, then the packet is coded at full rate. The aforementioned U.S. patent application Ser. No. 08/288,413 now U.S. Pat. No. 5,742,734, teaches of methods for reducing the number of packets encoded at full rate with minimum impact on perceptual quality. U.S. patent application Ser. No. 08/288,413, now U.S. Pat. No. 5,742,734, describes how to select packets that would otherwise be coded at full rate and mark these packets to be coded at a lower rate. The methods taught in U.S. patent application Ser. No. 08/288, 413 can be used in conjunction with the vocoder of U.S. patent application Ser. No. 08/004,484, now U.S. Pat. No. 5,414,796, to reduce the number of packets encoded at full rate with a minimum impact on perceived quality.

Variable rate data source 20 encodes the input data and provides it at one of the predetermined rates. In the exemplary embodiment, a traffic channel is capable of carrying packets encoded at or below half rate. When a packet of data is encoded by variable rate data source 20 at full rate, then the size of the packet exceeds the capacity of an allocated traffic channel and must be transmitted using both a traffic channel and an overflow channel.

If the data packet provided by variable rate data source 20 is a half rate, quarter rate or eighth rate packet, then variable rate data source 20 provides the packet directly to formatter 24. Formatter 24 generates a set of redundant bits in accordance with error correction and detection methods that are well known in the art. In the exemplary embodiment, the redundant bits are cyclic redundancy check (CRC) bits, the generation is detailed in the aforementioned copending U.S. patent application Ser. No. 08/171,146.

FIGS. 3a–3d illustrate the packet structures of the exemplary embodiment. FIG. 3a illustrates the packet structure of a full rate packet consisting of 172 information symbols followed by 12 redundant symbols (F) and then by 8 tail symbols (T). FIG. 3b illustrates the packet structure of a half rate packet consisting of 80 information symbols followed by 8 redundant symbols and then by 8 tail symbols. FIG. 3c illustrates the packet structure of a quarter rate packet consisting of 34 information symbols followed by 6 redundant symbols and then by 8 tail symbols. FIG. 3d illustrates the packet structure of an eighth rate packet consisting of 16 information symbols followed by 8 tail symbols. In the exemplary embodiment the tail symbols are a series of binary zeros used to clear out the memory of encoder 26 and to allow packets to be decoded separately at the decoder in the receiver system.

Formatter 24 outputs the packet to encoder 26 which encodes the packet into encoded symbols. In the exemplary embodiment, encoder 26 is a rate ½ convolutional encoder. In an exemplary embodiment, the convolutional encoder is implemented using a digital shift register with feedback. Encoder 26 provides the encoded packet to interleaver 28.

Interleaver 28 reorders the binary digits of the encoded packet in accordance with a predetermined interleaver format. In the exemplary embodiment, interleaver 26 is a block interleaver. In a block interleaver, the data is input in columns and output in rows, thus increasing the diversity of the data. In addition, the implementation of interleaver 28 for the present invention provides redundancy in the packets such that each packet is of full capacity consisting of the same number of binary digits. The addition of redundancy is described below.

Figure 4A:
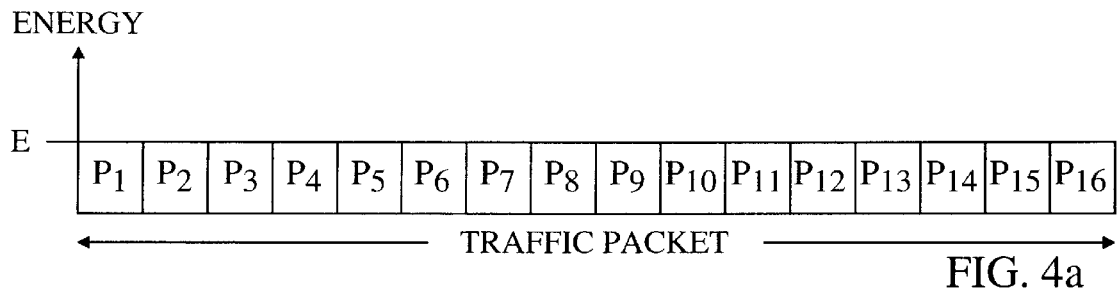
FIGS. 4a–4e is an illustration of the redundancy in a transmission packet and the transmission energy level of the packet.
Figure 4B:
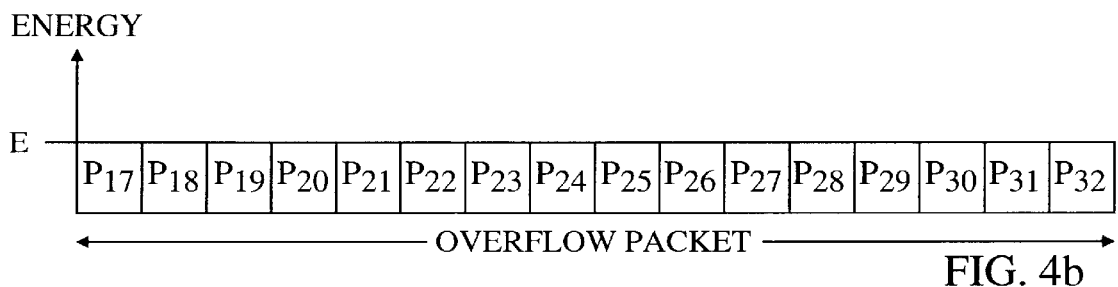
Figure 4C:
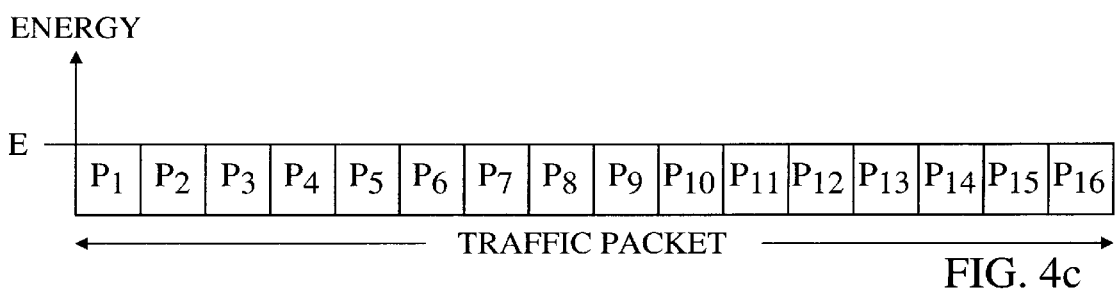
Figure 4D:
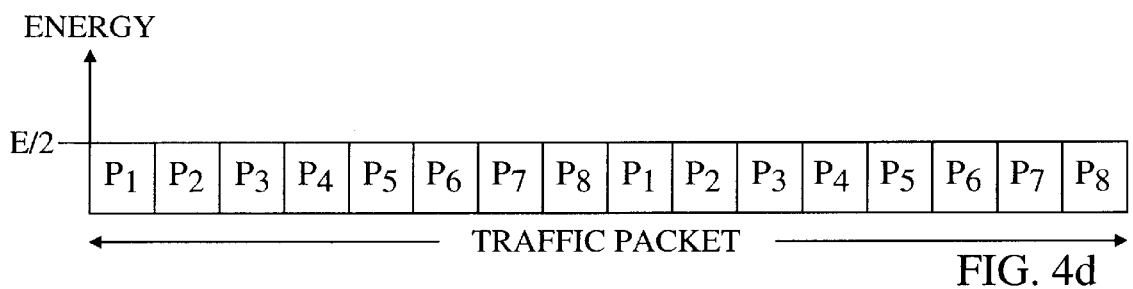
Figure 4E:
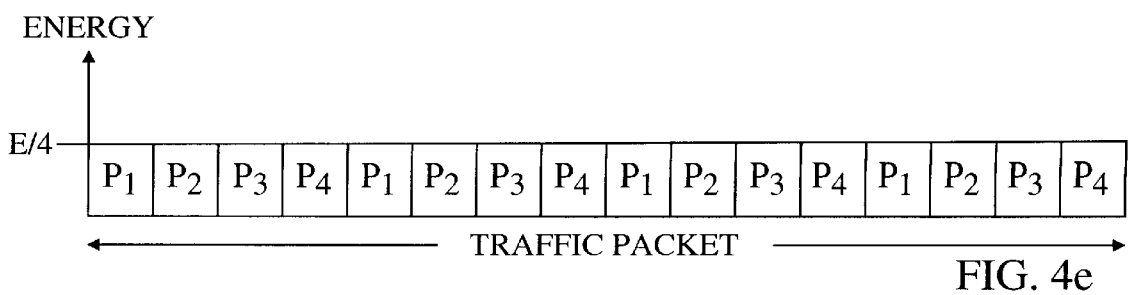

Referring to FIGS. 4a–4e, interleaver 28 interleaves the binary digits of the packet, then groups the reordered binary digits into symbols. The binary digits may be the symbols themseleves or the binary digits comprising the symbols. In the exemplary embodiment, each power control group ($P_1$–$P_{32}$) consists of 24 binary digits. FIGS. 4a and 4b illustrate the packet format for a full rate packet. The packet is split into halves with the first half of the full rate packet illustrated in FIG. 4a transmitted on the traffic channel and the second half of the full rate packet illustrated in FIG. 4b transmitted on the overflow channel. Note no redundancy is present in either half of the packet, because transmission of a full rate packet uses the entire capacity of both the allocated traffic channel and accompanying overflow channel. FIG. 4c illustrates a half rate traffic packet. Note that because transmission of the half rate packet utilizes the full capacity of the traffic channel, there is no repetition provided in the packet. FIG. 4d illustrates a quarter rate packet, in which each symbol is provided twice. FIG. 4e illustrates an eighth rate traffic packet, in which each symbol is provided four times. The ordering of the power control groups in FIGS. 4d–4e provide maximum average separation between a power control group and its duplicate. This way potentially if a power control group is lost in transmission, the information may be recovered by using the duplicate and vice versa. The ordering of the power control groups in FIGS.

4a–4e is for exemplary purposes and the present invention applies equally to all orderings.

The interleaved packet is provided by interleaver 28 to modulator 30. Modulator 30 modulates the packet in order to provide the packet on the allocated traffic channel. In the exemplary embodiment modulator 30 is a code division multiple access (CDMA) modulator as described in detail in U.S. Pat. Nos. 4,901,307 and 5,103,459. In the exemplary embodiment, each packet is spread by a Walsh sequence (Wn) that is unique to that traffic channel and which is orthogonal to all other Walsh sequences used by all other traffic channels and overflow channels. The spread packet is then covered using a pseudorandom noise (PN) sequence which provides greater separation in codespace. Each traffic channel and overflow channel is distinguished uniquely by its Walsh sequence. There are a limited number of available orthogonal sequences, so that the greater number of available overflow channels the fewer available traffic channels. Conversely, the more traffic channels that are allocated, the fewer the number of available overflow channels. This illustrates how the capacity of the system trades off against the probability of a full rate frame being blocked from transmission. Allowing the number of overflow channels to vary with usage and propagation path quality allows for maximal utility of the communication resource. In an implicit channel assignment system, this requires additional overhead or signaling information in order to keep the remote receivers abreast of the number of possible overflow channels. In both implicit and explicit channel assignment systems, this entails increased complexity in the transmission system and in particular complexity of increased in cell controller 40. Modulator 30 provides the modulated packet to transmitter 34, which frequency upconverts and amplifies the modulated packet, and provides it to antenna 36 which broadcasts the signal.

Because the receiver of the present invention can combine the received energy of the redundantly provided symbols, it is not necessary to transmit packets containing repetition at the same energy as packets not containing repetition. In the exemplary embodiment, the energy for transmission of a packet scales inversely with the amount of repetition present in the packet. Transmitter 34 receives a rate signal (RATE) from cell controller 40 and amplifies the signal in accordance with the rate indicated by the rate signal.

The relationship between the necessary transmission energy and the amount of repetition is illustrated in FIGS. 4a–4e. FIGS. 4a and 4b illustrate the overflow and traffic packets required to carry a full rate packet of data. A full rate packet requires the entire capacity of both the overflow channel and the traffic channel, so no repetition is provided in either packet and both the overflow packet and the traffic packet are transmitted at a maximum packet energy level E. Again, in FIG. 4c, in a half rate packet, there is no repetition so the packet is provided at an energy level E. In FIG. 4d, in a quarter rate packet, there is a repetition rate of two so the packet is provided at half the packet energy of the half rate packet or E/2. In FIG. 4e, in an eighth rate packet, there is a repetition rate of four so the packet is provided at a quarter of the packet energy of the half rate packet or E/4.

In the case of transmitting a full rate packet, variable rate data source 20 provides the packet or packets to selector 22 and sends a request (REQ) signal to cell controller 40. Cell controller 40 determines if an overflow channel is available and provides a rate (RATE) indication signal to selector 22 indicating if an overflow channel of the v potential overflow channels is available. As described previously, v may be the set of all possible channels not designated for use as traffic channels or v may be a subset of those channels for use by the receiver to which the message is to be sent.

When the rate of the packet provided by variable rate data source 20 is full rate, there are several embodiments of variable rate data source 20 for providing the full rate packet. The first embodiment of variable rate data source 20 generates the full rate packet independently of the availability of an overflow channel. In the event that an overflow channel is not available, then no packet is transmitted and a packet erasure is detected at the receiver. Because the packets are of short time duration a user will not be adversely effected by the occasional dropped packet. In this case, a full rate packet is provided to selector 22, which either provides the full rate packet to formatter 24 if an overflow channel is available or does not provide any packet if an overflow channel is not available.

A second embodiment of variable rate data source 20 provides both a full rate and a half rate packet simultaneously representative of the same input data (i.e the input speech is coded at different rates). If an overflow channel is available, then the full rate packet is transmitted. If an overflow channel is not available, then the half rate packet is transmitted. In this case variable rate data source 20 provides two separately encoded packets to selector 22. If an overflow channel is available, then selector 22 provides the full rate packet to formatter 24. If an overflow channel is not available, then selector 22 provides the half rate packet to formatter 24.

A third embodiment of variable rate data source 20 encodes the data output by variable data source 20 in such a way that the data of the half rate packet is a subset of the full rate packet. This can be achieved in two alternative embodiments. In the first implementation, variable rate data source 20 can be designed to be optimized for half rate quality with additional binary digits added to the packet in the case that an overflow channel is available. In an alternative embodiment, variable rate data source 20 can be optimized for speech quality at full rate with the perceptually least significant data being dropped or truncated if an overflow channel is not available.

In this third embodiment of variable rate data source 20, variable rate data source 20 provides a full rate packet to selector 22. If an overflow channel is available, then selector 22 provides the whole full rate packet to formatter 24. If an overflow channel is not available, then selector 22 provides only a predetermined subset of the full rate packet to formatter 24. In the cases described above, if an overflow channel is not available, then selector 22 provides a packet at half rate or less and the transmission of the packet proceeds as described earlier.

If an overflow channel is available, then cell controller 40 provides a RATE signal to selector 22 indicating that an overflow channel is available, and selector 22 provides the full rate packet to formatter 24. In the exemplary embodiment, formatter 24 formats the packet as illustrated in FIG. 3a by appending 12 redundant bits and 8 tail bits to the output packet. Formatter 24 outputs its packet to encoder 26. Encoder 26 encodes the packet as described above and provides the encoded packet to interleaver 28.

Interleaver 28 can operate in one of two ways. Either it can reorder the full packet as a unit or it can split the packet in half and reorder each half independently. In either case, interleaver 28 provides a first half of the interleaved packet to modulator 30 for transmission over the allocated traffic channel and provides a second half to modulator 32 for transmission over the assigned overflow channel. As described above, modulator 30 modulates the packet to provide the packet on the allocated traffic channel. Modulator 32 modulates the second half of the packet provided by interleaver 28 to be provided on the assigned overflow channel.

Modulator 32 modulates the packet in accordance with the CHANNEL ASSIGNMENT signal from cell controller 40 which indicates the identity of the assigned overflow channel. In the exemplary embodiment, modulator 32 spreads the packet by a unique Walsh sequence, ($W_j$), which is determined in accordance with the CHANNEL ASSIGNMENT signal. The Walsh sequence ($W_j$) is unique for transmissions on the selected overflow channel assuring the signal will be orthogonal to all other transmitted signals. As described previously the spread signal is then spread again by a pseudorandom noise sequence.

Modulators 30 and 32 provide the modulated packets to transmitter 34, which upconverts and amplifies the modulated packets and provides them to antenna 36, which broadcasts the signal. In this case because there is no repetition, the packet is transmitted with packet energy E as shown in FIGS. 4a and 4b.

Now referring to FIG. 5, the signal broadcast by antenna 36 of FIG. 2 is received at the user terminal by antenna 50 and provided to receiver (RCVR) 52. Receiver 52 downconverts and amplifies the received signal and provides the received signal to at least one demodulation cicuit or "finger" of a RAKE receiver should such a design be used. Each finger is comprised of a traffic demodulator 54 and overflow demodulators 55a–55v. It should be noted that v is the number of overflow channels which could possibly be used in conjunction with the traffic channel in question. Note that v can be the total number of potential overflow channels or it can be a predetermined subset of the potential overflow channels.

In the exemplary embodiment, traffic demodulator 54 and overflow demodulators 55a–55v are CDMA demodulators as disclosed in the aforementioned U.S. Pat. Nos. 4,901,307 and 5,103,459. Traffic demodulator 54 and overflow demodulators 55a–55v are binary phase shift keying (BPSK) demodulators. Traffic demodulator 54 despreads the received signal and further recovers the traffic data by despreading by the assigned Walsh sequence. Overflow demodulators also despread the received signal and further receives the overflow data by despreading by a respectively assigned one of the various Walsh sequences assigned to the overflow channels.

Traffic demodulator 54 demodulates the received packet in accordance with allocated traffic channel and provides the demodulated packet to buffer 56. Buffer 56 temporarily stores the demodulated traffic packet and provides the packet in accordance with a predetermined timing sequence.

The received signal is, also, provided to the v overflow demodulators 55a–55v. Overflow demodulators 55a–55v each demodulate the received signal in accordance with a different overflow channel. Each of the overflow demodulators 55a–55v provide a separate demodulated packet to buffer 56. Buffer 56 temporarily stores the demodulated overflow packets and provides the packets in accordance with a predetermined timing sequence.

Buffer 56 provides the demodulated packets to de-interleaver 57 in such a way that all possible transmission hypotheses can be tested. In the exemplary embodiment, the transmission hypotheses are tested in the following order: eighth rate, quarter rate, half rate, full rate using overflow channel 1 to carry the second half of the packet, full rate using overflow channel 2 to carry the second half of the packet, . . . , full rate using overflow channel v to carry the second half of the packet.

In the exemplary embodiment, buffer 56 first provides the demodulated traffic packet to de-interleaver 57, which reorders the data in accordance with an eighth rate ordering format. De-interleaver 57 provides the reordered packet to decoder 58, which decodes the packet and assigns the decoded packet a value indicating the probability that the packet transmitted was an eighth rate packet. In the exemplary embodiment decoder 58 is a Viterbi decoder of constraint length 7. Viterbi decoders of this type are described in detail in the aforementioned U.S patent application Ser. No. 08/023,789.

Next, buffer 56 provides the demodulated traffic packet to de-interleaver 57 which reorders the data in accordance with a quarter rate ordering format. De-interleaver 57 provides the reordered packet to decoder 58, which decodes the packet and assigns the decoded packet a value indicating the probability that the packet transmitted was a quarter rate packet.

Next, buffer 56 provides the demodulated traffic packet to de-interleaver 57 which reorders the data in accordance with a half rate ordering format. De-interleaver 57 provides the reordered packet to decoder 58, which decodes the packet and assigns the decoded packet a value indicating the probability that the packet transmitted was a half rate packet.

Next, buffer 56 provides the demodulated traffic packet concatenated with the demodulated overflow packet from overflow demodulator 1, block 55a, to de-interleaver 57 which reorders the data in accordance with a full rate ordering format. De-interleaver 57 provides the reordered packet to decoder 58, which decodes the packet and assigns the decoded packet a value indicating the probability that the packet transmitted was a full rate packet with the second half of the packet transmitted on overflow channel 1.

Next, buffer 56 then provides the demodulated traffic packet concatenated with the demodulated overflow packet from overflow demodulator 2, block 55b, to de-interleaver 57 which reorders the data in accordance with a full rate ordering format. De-interleaver 57 provides the reordered packet to decoder 58, which decodes the packet and assigns the decoded packet a value indicating the probability that the packet transmitted was a full rate packet with the second half of the packet transmitted on overflow channel 2. The process is repeated for each of the v possible overflow channels. At the end of the process all decoded packets are provided to diversity combiner element 60, which along with decoded packet estimates from other propagation paths demodulated by other fingers are combined to provide an improved estimate of the transmitted packet. Design of diversity combiner elements are described in detail in the aforementioned U.S. patent application Ser. No. 07/432,552.

In the second exemplary embodiment of the transmission system of the present invention, the traffic portions of the data packet and the overflow portions of the data packet are encoded together and the overflow channel assignment data is provided explicitly. In an explicit overflow channel assignment implementation, the channel assignment information is transmitted with the traffic data. Explicit overflow channel assignment greatly reduces the decoding operation in the receiver because the receiver knows upon which overflow channel the overflow data will be provided. Explicit overflow channel assignment reduces the amount of information that can be provided on the traffic channel.

Referring back to FIG. 2, input data for transmission is provided to variable rate data source 20. Variable rate data source 20 provides data at four different rates. If the transmission rate of the packet is less than full, the transmission system operates identically to the transmission system of the first exemplary embodiment. When variable rate data source 20 provides a full rate packet to selector 22, it provides a corresponding request signal to cell controller 40. If an overflow channel is not available, then selector 22 provides a packet at half rate or less and the transmission of the packet proceeds as described previously.

If an overflow channel is available, then cell controller 40 provides a RATE signal to selector 22 indicating that an overflow channel is available, and selector 22 provides the full rate packet to formatter 24. Cell controller 40, also, provides a channel assignment signal to formatter 24. The channel assignment signal consists of b binary symbols, where b is the smallest integer such that:

$$b \leq \log_2 v, \qquad (1)$$

where v is the number of possible overflow channels for carrying the second part of the full rate data packet.

In the exemplary embodiment, formatter 24 formats the packet as illustrated in FIG. 3a. The explicit channel assignment data may replace any portion of the packet. In one preferred embodiment, the channel assignment bits replace a fraction of the tail bits in the packet. In another preferred embodiment, the channel assignment bits are provided in the left most portion of the packet, because this part of the packet is decoded first at the receiver.

Formatter 24 outputs its packet to encoder 26. Encoder 26 encodes the packet as described above and provides the encoded packet to interleaver 28. In the second exemplary embodiment, interleaver 28 interleaves the traffic channel portion of the full rate packet separately from the overflow channel portion of the full rate packet. The interleaved traffic channel packet is provided to modulator 30 and the interleaved overflow channel packet is provided to modulator 32.

As described above, modulator 30 modulates the traffic channel packet to provide the packet on the allocated traffic channel. Modulator 32 modulates the overflow channel packet provided by interleaver 28 to be provided on the assigned overflow channel. As described above, modulator 32 modulates the packet in accordance with the CHANNEL ASSIGNMENT signal from cell controller 40 which indicates the identity of the assigned overflow channel.

Modulators 30 and 32 provide the modulated packet to transmitter 34, which upconverts and amplifies the modulated packet and provides it to antenna 36, which broadcasts the signal. In this case because there is no repetition the packet will be transmitted at the packet energy level E as shown in FIGS. 4a and 4b.

Now referring to FIG. 6, the signal broadcast by antenna 36 of FIG. 2 is received by antenna 70 and provided to receiver (RCVR) 72. Receiver 72 downconverts and amplifies the received signal and provides the received signal to traffic demodulator 74 and to buffer 76. Reception of packets that are of a rate less than full rate proceeds as described previously.

In the exemplary embodiment, traffic demodulator 74 and overflow demodulator 78 are code division multiple access (CDMA) demodulators as disclosed in the aforementioned U.S. Pat. Nos. 4,901,307 and 5,103,459. Again, in the exemplary embodiment, traffic demodulator 74 and overflow demodulator 78 are binary phase shift keying (BPSK) demodulators.

In the reception of full rate packets, traffic demodulator 74 demodulates the received packet in accordance with the allocated traffic channel and provides the demodulated packet to de-interleaver 80. De-interleaver 80 reorders the binary symbols of the traffic channel packet and provides the reordered packet to decoder 82. Decoder 82 decodes the packet. Again, in the exemplary embodiment decoder 82 is a Viterbi decoder. Viterbi decoders are described in detail in the aforementioned U.S patent application Ser. No. 08/023, 789, now abandoned.

Decoder 82 provides a channel assignment signal to overflow demodulator 78. The decoder may decode the entire traffic channel packet before providing the overflow channel assignment data to overflow demodulator 78. However, in a preferred embodiment, the channel assignment data is provided in the left most portion of the packet such that it is the first data decoded by decoder 82. This reduces the required size of buffer 76 and allows faster decoding of the entire full rate packet.

After decoder 82 provides the channel assignment signal to overflow demodulator 78, decoder 82 provides a timing signal to buffer 76. Buffer 76, in response to the timing signal, provides the received packet to overflow demodulator 78. Overflow demodulator 78 demodulates the received packet in accordance with the channel assignment signal and provides the demodulated packet to de-interleaver 80. De-interleaver 80 as described previously reorders the data in the demodulated overflow packet and provides the reordered packet to decoder 82. Decoder 82 decodes the overflow portion of the packet. Decoder 82 concatenates the decoded traffic channel packet with the decoded overflow channel packet and provides the result to diversity combiner element 84. Combiner element 84 receives the decoded packet estimate from decoder 82 and packet estimates from decoded estimates from other fingers. Combiner 84 operates, as described regarding combiner element 60, to provide an improved packet estimate.

In the third exemplary embodiment of the transmission system of the present invention, the traffic portions of the data packet and the overflow portions of the data packet are encoded together and the overflow channel assignment data is provided explicitly. In the third exemplary embodiment, the explicitly provided channel assignment data relates to the next packet of data as opposed to the current packet as described in the second embodiment. Providing the channel assignment data ahead of time reduces the necessary complexity of the accompanying receiving system.

Again referring back to FIG. 2, input data for transmission is provided to variable rate data source 20. Variable rate data source 20 encodes the current packet of data and determines the encoding rate for the next packet of data. If the rate of the next packet of data is full rate, variable rate data source 20 sends a request (REQ) signal to cell controller 40. In response to the request signal, cell controller 40 determines whether an overflow channel is available for transmitting the next packet of data.

If an overflow channel is available for transmitting the next packet of data, cell controller 40 provides a next packet channel assignment (NFCA) signal to formatter 24. Selector 22 provides current packet as described earlier to formatter 24. Formatter 24 combines the next packet channel assignment information with the information data, the redundant data and tail bits, and provides the packet to encoder 26. Because the channel assignment data is provided ahead of time, it is not necessary to provide the channel assignment data at the leftmost portion of the packet. Encoder 26 encodes the packet as described previously and provides the encoded packet to interleaver 28.

Interleaver 28 reorders the binary symbols in the current packet. If the current packet is a full rate packet, then the packet may be interleaved as a single unit as described in the first exemplary embodiment or the packet may be interleaved in two separate halves as described in the second exemplary embodiment.

If the current packet is less than full rate, it is provided by interleaver 28 to modulator 30. The interleaved packet is modulated in accordance with the traffic channel upon which the packet is to be transmitted and then provided to transmitter 34 where the packet is upconverted and amplified and then broadcast through antenna 36. If the current packet is full rate, it is provided by interleaver 28 to modulators 30 and 32. The interleaved packet is modulated by modulator 30 so as to be provided on the traffic channel and by modulator 32 so as to be provided on the assigned overflow channel. The packet is then provided by modulators 30 and 32 to transmitter 34 where it is upconverted and amplified and then broadcast by antenna 36.

In an improved embodiment, cell controller 40 determines if there is an overflow channel available for transmission of the subsequent frame and if there is not cell controller 40 sends a message to variable rate data source 20 which re-encodes the subsequent frame at a rate that can be transmitted without using an overflow channel.

Now again referring to FIG. 6, the signal broadcast by antenna 36 of FIG. 2 is received by antenna 70 and provided to receiver (RCVR) 72. Receiver 72 downconverts and amplifies the received signal and provides the received signal to traffic demodulator 74 and as illustrated in dashed line directly to overflow demodulator overflow demodulator 78. In this implementation, buffer 76 is not used.

Traffic demodulator 74 demodulates the received packet in accordance with allocated traffic channel and provides the demodulated packet to de-interleaver 80. If the previously received packet contained channel assignment information for the current packet, then this information is provided by buffer 83 to overflow demodulator 78. Overflow demodulator 78 demodulates the received signal in accordance with the overflow channel assignment information provided in the previous packet.

Traffic demodulator 74 provides the demodulated traffic portion of the transmitted packet to de-interleaver 80. De-interleaver 80 reorders the packet in accordance with a predetermined de-interleaving format and provides the reordered packet to decoder 82. Decoder 82 decodes the packet. If there is channel assignment data for the next packet present in the decoded packet, then decoder 82 provides the channel assignment data for the next packet to buffer 83. Decoder 82 also provides the decoded packet to the combiner element 84 which combines the decoded estimate from decoder 82 with decoded estimates from other fingers to provide an improved decoded estimate.

In the fourth exemplary embodiment of the transmission system of the present invention, the traffic portions of the data packet and the overflow portions of the data packet are encoded separately and the overflow channel assignment data is provided implicitly.

Again referring back to FIG. 2, input data for transmission is provided to variable rate data source 20. If the data packet provided by variable rate data source 20 is a half rate, quarter rate or eighth rate packet, then the transmission system operates as described in the first exemplary embodiment. If the packet is a full rate packet, then variable rate data source 20 sends a request signal to cell controller 40 and provides the packet to selector 22. Cell controller 40, in response to the request signal from variable rate data source 20, provides a rate signal to selector 22. If the rate signal indicates that there is not an available overflow channel, then selector 22 provides a lower rate packet as described previously, and transmission proceeds as described in the first exemplary embodiment.

If the rate signal indicates that there is an available overflow channel, then selector 22 provides the full rate packet to formatter 24. Formatter 24 affixes the redundant bits and tail bits as described in the first exemplary embodiment. The formatted packet is then provided to encoder 26. Encoder 26 encodes the packet as two separate halves, which results in two separately encoded packets.

Encoder 26 provides the two encoded packets to interleaver 28. Interleaver 28 reorders the binary symbols of the two encoded packets separately. Interleaver 28 provides a first interleaved packet to modulator 30 and a second interleaved packet to modulator 32.

As described above, modulator 30 modulates the packet so as to provide the first interleaved packet on the allocated traffic channel. Modulator 32 modulates the second interleaved packet provided by interleaver 28 so as to be provided on the assigned overflow channel. Modulator 32 modulates the packet in accordance with the CHANNEL ASSIGNMENT signal from cell controller 40 which indicates the identity of the assigned overflow channel.

Modulators 30 and 32 provide the modulated packet to transmitter 34, which upconverts and amplifies the modulated packet and provides it to antenna 36, which broadcasts the signal. In this case because there is no repetition the packet will be transmitted at the packet energy level E as shown in FIGS. 4a and 4b.

Figure 7:
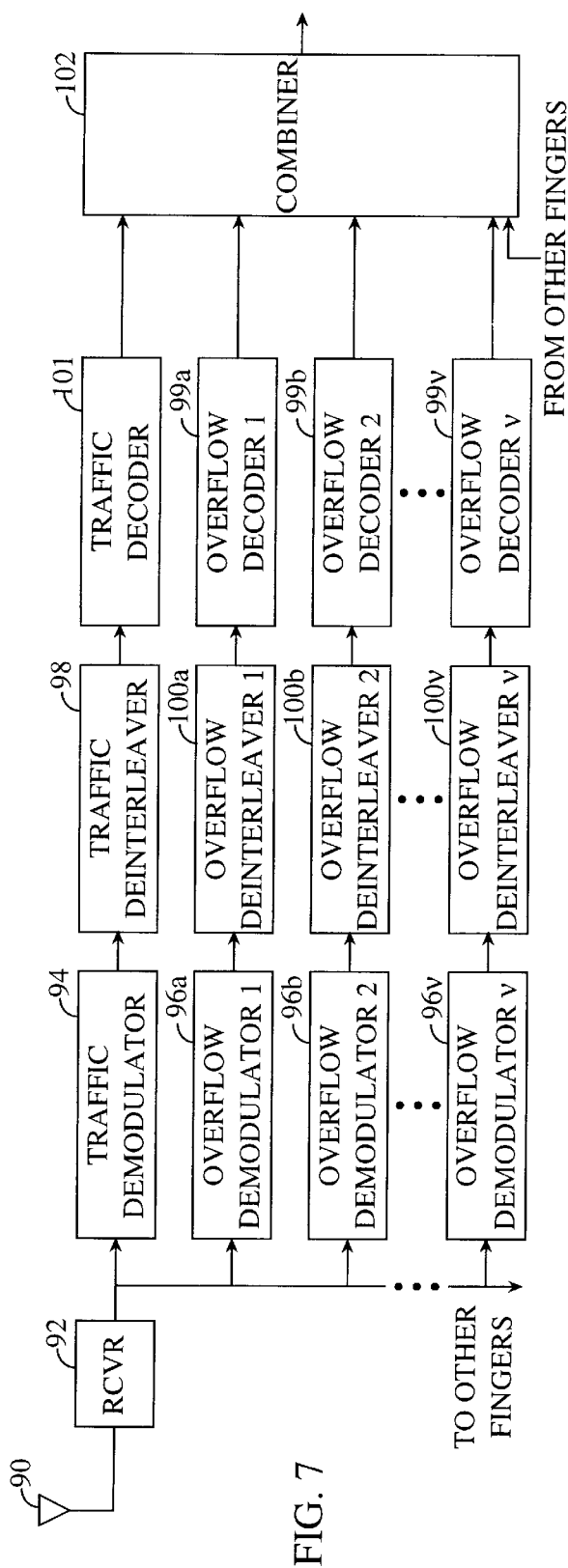
FIG. 7 is a block diagram of a receiver system for the reception of data with implicit overflow channel assignment where the overflow data is encoded separately from the traffic data.

Now referring to FIG. 7, the signal broadcast by antenna 36 of FIG. 2 is received by antenna 90 and provided to receiver (RCVR) 92. Receiver 92 downconverts and amplifies the received signal and provides the received signal to traffic demodulator 94 and to overflow demodulators 96a–96v of a first finger and to other fingers if a RAKE receiver design is employed. Again v is the number of possible overflow channels for the receiving system, this may be the set of all unused channels or a designated subset.

In the exemplary embodiment, traffic demodulator 94 and overflow demodulators 96a–96v are CDMA demodulators as disclosed in the aforementioned U.S. Pat. Nos. 4,901,307 and 5,103,459. In the exemplary embodiment, traffic demodulator 94 and overflow demodulators 96a–96v are binary phase shift keying (BPSK) demodulators.

Traffic demodulator 94 demodulates the received signal in accordance with allocated traffic channel demodulation format and provides the demodulated packet to traffic de-interleaver 98. The received signal is, also, provided to the v overflow demodulators 96a–96v. Overflow demodulators 96a–96v each demodulate the received signal in accordance with a different hypothetical overflow channel demodulation format. Demodulators 96a–96v provide a demodulated packet to overflow de-interleavers 100a–100v, respectively.

Traffic de-interleaver 98 and overflow de-interleavers 100a–100v reorder the binary symbols in the demodulated packets and provide the reordered packets to traffic decoder 101 and overflow decoders 99a–99v, respectively. Traffic decoder 101 and overflow decoders 99a–99v decode the reordered packets and provide them to combiner 102. Combiner 102 determines if any of the decoded packets from overflow decoders 99a–99v are the second halves of the decoded traffic packet, by checking the redundant bits to determine if there is a match between the decoded overflow packet and the decoded traffic packet. If combiner 102 determines that any of the decoded packets from overflow decoders 99a–99v are the second halves of the decoded traffic packet, then combiner 102 concatenates the decoded overflow packet to the decoded traffic packet. Combiner 102 combines the decoded packet with decoded packet estimates of other fingers as described previously, to provide an improved packet estimate.

In the fifth exemplary embodiment of the transmission system of the present invention, the traffic portions of the data packet and the overflow portions of the data packet are encoded separately and the overflow channel assignment data for the current packet is provided explicitly.

Again referring to FIG. 2, input data for transmission is provided to variable rate data source 20. In the transmission of packets that are less than full rate, transmission proceeds as described earlier. Again, variable rate data source 20 provides data at four different rates. If the transmission rate of the packet is of a rate less than full rate, the transmission system operates identically to the transmission system of the first exemplary embodiment. When variable rate data source 20 provides a full rate packet to selector 22, it provides a corresponding request signal to cell controller 40. If an overflow channel is not available, then selector 22 provides a packet at half rate or less and the transmission of the packet proceeds as described above.

If an overflow channel is available, then cell controller 40 provides a RATE signal to selector 22 indicating that an overflow channel is available, and selector 22 provides the full rate packet to formatter 24. Cell controller 40, also, provides a channel assignment signal to formatter 24. As described earlier, the channel assignment signal consists of b binary symbols, where b is determined by the formula:

$$b = \log_2 v, \qquad (2)$$

where v is the number of possible overflow channels for carrying the second part of the full rate data packet.

The full rate packet and the channel assignment data are provided to formatter 24. In a preferred embodiment, the packet is formatted as described in the second exemplary embodiment, with the channel assignment data positioned in the packet so as to be the first portion of the packet decoded at a receiver. The formatted packet is provided to encoder 26.

Encoder 26 encodes the full rate packet in two separate halves. The first encoded packet and the second encoded packet are provided to modulators 30 and 32 respectively. Modulator 30 modulates the first encoded packet in accordance with the allocated traffic channel modulation format and modulator 32 modulates the second encoded packet in accordance with the assigned overflow channel modulation format. The modulated packets are provided to transmitter 34 which upconverts and amplifies the modulated packets as described earlier. The signal is provided by transmitter 34 to antenna 36 and broadcast to receiving systems.

Figure 8:
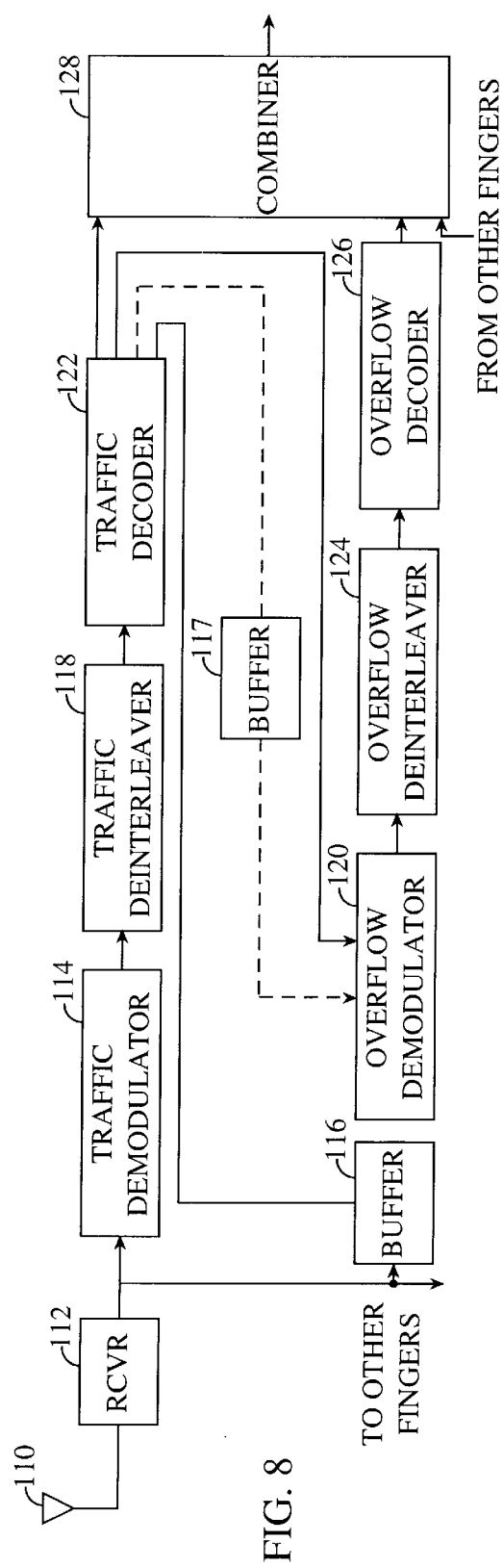
FIG. 8 is a block diagram of a receiver system for the reception of data with explicit overflow channel assignment where the overflow data is encoded separately from the traffic data.

Now referring to FIG. 8, the signal broadcast by antenna 36 of FIG. 2 is received by antenna 110 and provided to receiver (RCVR) 112. Receiver 112 downconverts and amplifies the received signal and provides the received signal to traffic demodulator 114 and to buffer 116. Reception of packets that are of a rate less than full rate proceeds as described previously.

In the exemplary embodiment, traffic demodulator 114 and overflow demodulator 120 are code division multiple access (CDMA) demodulators as disclosed in the aforementioned U.S. Pat. Nos. 4,901,307 and 5,103,459. Again, in the exemplary embodiment, traffic demodulator 114 and overflow demodulator 120 are binary phase shift keying (BPSK) demodulators.

In the reception of full rate packets, traffic demodulator 114 demodulates the received packet in accordance with the allocated traffic channel demodulation format and provides the demodulated packet to traffic de-interleaver 118. De-interleaver 118 reorders the binary symbols of the traffic channel packet and provides the reordered packet to traffic decoder 122. Traffic decoder 122 decodes the packet. Again, in the exemplary embodiment traffic decoder 122 and overflow decoder 126 are Viterbi decoders of constraint length 7. Viterbi decoders are described in detail in the aforementioned U.S patent application Ser. No. 08/023,789.

Decoder 122 provides channel assignment information to overflow demodulator 120 and provides the decoded traffic packet to combiner element 128. The decoder may decode the entire traffic channel packet before providing the overflow channel assignment data to overflow demodulator 120. However, in a preferred embodiment, the channel assignment data is provided in the beginning of the packet such that it is the first data decoded by decoder 122. This reduces the required size of buffer 116 and allows faster decoding of the packet.

After decoder 122 provides the channel assignment signal to overflow demodulator 120, decoder 122 provides a timing signal to buffer 116. Buffer 116, in response to the timing signal, provides the received packet to overflow demodulator 120. Overflow demodulator 120 demodulates the received packet in accordance with the assigned overflow channel demodulation format and provides the demodulated packet to overflow de-interleaver 124.

De-interleaver 124 as described previously reorders the data in the demodulated overflow packet and provides the reordered packet to overflow decoder 126. Overflow decoder 126 decodes the overflow portion of the packet and provides the decoded overflow packet to combiner 128. Combiner 128 combines the decoded overflow packet with the decoded traffic packet to provide the full rate packet estimate. Combiner 128 also serves to combine packet estimates from other fingers as described previously.

In the sixth exemplary embodiment of the transmission system of the present invention, the traffic portions of the data packet and the overflow portions of the data packet are encoded separately and the overflow channel assignment data for the next packet is provided explicitly.

Again referring to FIG. 2, input data for transmission is provided to variable rate data source 20. Variable rate data source 20 encodes the current packet and determines the encoding rate for the next packet. If the encoding rate for the next packet is full rate, variable rate data source 20 sends a request signal to cell controller 40. If an overflow channel is available, for transmission of the next packet of data then cell controller 40 provides a RATE signal to selector 22 indicating that an overflow channel is available, and selector 22 provides the full rate packet to formatter 24. Cell controller 40, also, provides a channel assignment signal to formatter 24.

The full rate packet and the channel assignment data are provided to formatter 24. The packet is formatted as described in the third exemplary embodiment with the channel assignment data for the next data positioned in the packet. The formatted packet is provided to encoder 26.

Encoder 26 encodes the full rate packet in two separate halves. The first encoded packet and the second encoded packet are provided to interleaver 28 which reorders the binary symbols in the packet separately. Interleaver 28 provides the reordered packets to modulators 30 and 32, respectively. Modulator 30 modulates the first encoded packet in accordance with the allocated traffic channel modulation format and modulator 32 modulates the second encoded packet in accordance with the assigned overflow channel modulation format. The modulated packets are provided to transmitter 34 which upconverts and amplifies the modulated packets as described earlier. The signal is provided by transmitter 34 to antenna 36 and broadcast to receiving systems.

Now referring to FIG. 8, the signal broadcast by antenna 36 of FIG. 2 is received by antenna 110 and provided to receiver (RCVR) 112. Receiver 112 downconverts and amplifies the received signal and provides the received signal to traffic demodulator 114 and to overflow demodulator overflow demodulator 120.

Traffic demodulator 114 demodulates the received packet in accordance with the allocated traffic channel demodulation format and provides the demodulated packet to traffic de-interleaver 118. Traffic de-interleaver 118 reorders the binary symbols of the packet and provides them to traffic decoder 122. Traffic decoder 122 decodes the packet and if there is channel assignment data in the packet for the next packet then this data is provided to buffer 117. Traffic decoder 122 provides the decoded packet to combiner 128.

If the previously received packet contained channel assignment information for the current packet, then this information is provided by buffer 117 to overflow demodulator 120. Overflow demodulator 120 demodulates the overflow portion of the packet in accordance with the channel assignment information provided by the previous packet.

Traffic demodulator 114 provides the demodulated traffic portion of the transmitted packet to traffic de-interleaver 118 where the traffic portion of the packet is reordered in accordance with a traffic channel de-interleaving format. The reordered packet is provided to traffic decoder 122 which decodes the traffic channel portion of the packet and provides it to combiner element 128. If the packet is full rate, then overflow demodulator 120 provides the demodulated overflow portion of the transmitted packet to overflow de-interleaver 124. Overflow de-interleaver 124 reorders the binary symbols of the overflow packet and provides the reordered overflow packet to overflow decoder 126. Decoder 126 decodes the overflow packet and provides the decoded overflow packet to combiner 128. Combiner 128 combines the decoded traffic packet with the decoded overflow packet. In addition, combiner 128 combines the packet estimate with packet estimates from other fingers as described previously to provide an improved packet estimate which is provided to the receiving system user.

The next part of the present invention to be described are the various methods of assigning the overflow channels. This assignment operation is performed by cell controller 40. The assignment of a pool of channels to calls can be provided in a variety of ways. The simplest being a random selection from the pool. A more sophisticated technique follows the design of experiment method known as statistical multiplexing. In a typical case, any channel in a common pool can be assigned to any call on a demand assignment basis. As described above this general strategy leads to systems and receivers which are unnecessarily complex. The present invention discloses new assignment strategies which minimize the complexity of the overall communication system.

As indicated above, the usual assignment approach is to assume that any of the channels in the overflow pool can be assigned to any call. This assignment strategy allows the maximum number of calls to be assigned overflow channels. However, it also requires the most complex receiver since the receiver must be prepared to receive information on a traffic channel and any of the overflow channels. If the number of overflow channels is allowed to vary, receivers must deal with this additional complexity.

In an alternative scheme, termed pre-assignment, a predetermined subset of overflow channels is pre-assigned to each user at the inception of the call. Then, when the time comes to post-assign an overflow channel to that call, the assigned overflow channel is chosen from this subset.

A simpler receiver can then be utilized because it needs to be capable of demodulating information on a limited set of channels. Hybrid schemes are envisioned whereby a primary pool of overflow channels is available for all calls but where a secondary pool of overflow channels is pre-assigned to each call in the event that an overflow channel from the primary pool is not available.

The following are objectives and advantages of the assignment methods of the present invention:

1. The design of balanced pre-assignment tables.
2. An algorithm for accomplishing post-assignment consistent with a pre-assignment table.
3. Determination of an optimal assignment strategy based on blockage probability of the various schemes.

As described above, when a single channel does not have the information carrying capacity to accommodate a packet, two or more channels can be used to carry that packet. In the preferred embodiment, a single traffic channel is sufficient to carry a packet most of the time, but occasionally one or more overflow channels are required to aid in carrying the packet.

A call is a sequence of packets. As described previously when a call is set up it is assigned sole usage of a single traffic channel but when two or more channels are required to carry a packet in the call, it is given temporary use of additional overflow channels. Such a scheme is referred to in the present invention as statistical multiplexing.

As described above there are two sets of channels: a set of traffic channels and a set of overflow channels. When a call is set up, one of the traffic channels is permanently assigned for the transmission of the packets in that call. In the occasional circumstance that a packet in the call requires two or more channels, the packet is carried on the allocated traffic channel and one or more of the overflow channels which are temporarily assigned to that user. If another packet in the call requires two or more channels, the same traffic channel is used but perhaps a different overflow channel is used to carry the second part of this packet.

When a single traffic channel carries a packet, the traffic channel is active. When a packet requires two channels, (a traffic channel and an overflow channel), the assigned traffic channel is superactive.

Overflow channels may be assigned permanently to calls (or equivalently to active traffic channels). However, where a traffic channel becomes superactive infrequently, this solution is wasteful of capacity. For example, even in the case where only one overflow channel is required to accommodate a superactive traffic channel, such a scheme would result in one half of the channels being assigned as overflow channels. Yet, at any instant of time, most of these overflow channels would be idle. Rather, the present invention discloses methods by which the set of traffic channels share a relatively smaller number of overflow channels.

The following invention describes methods for accomplishing this aim. One application of this invention is to the downlink path of the Globalstar low orbit satellite communication system, i.e., the path from the satellite to the mobile receivers. N denotes the total number of channels (traffic overflow) in the communications resource. In the exemplary embodiment, N is equal to 128.

The exemplary embodiments present the specific case where N channels are partitioned into two fixed size groups consisting of n overflow channels and (N−n) traffic channels, although the ideas are easily extendible to the cases where the size of the groups can be varied with load, path quality, or any other factor. At any instant of time only b of the (N−n) traffic channels are active. Furthermore, only a small fraction of the b active channels are superactive.

In the exemplary embodiment, it is assumed that a superactive traffic channel requires only one overflow channel. It should be realized however, that the ideas to be discussed generalize to the case where a packet requires two or more overflow channels.

In the exemplary embodiment, there is a prior assignment (or pre-assignment) of overflow channels to active traffic channels. This assignment is such that each overflow channel is assigned to many active traffic channels but exactly k, ($k \leq n$), overflow channels are assigned to each active traffic channel. When an active traffic channel becomes superactive, a portion of the packet that is carried by that traffic channel is also carried by one of the k pre-assigned overflow channels. If k=n, all of the overflow channels are available for this purpose and the notion of a apriori assignment is superfluous. However, if k<n, the choice of overflow channels for a given superactive traffic channel is restricted by the pre-assignment.

Blockage occurs if any of the superactive traffic channels cannot have their excess capacity handled by the apriori assignment of overflow channels. The case where k=n is referred to as a completely dynamic assignment strategy. For a completely dynamic assignment strategy, blockage will occur if and only if the number of superactive traffic channels exceeds n, so that if each of the b active channels is superactive with probability p and if these events are statistically independent, then the probability of blockage will be:

$$P(\text{blockage}) = \sum_{i=v+1}^{b} \frac{b!}{(v-b)!v!} p^i (1-p)^{b-i}, \quad (3)$$

where v is the number of overflow channel provided for use of each user.

If k<n, blockage can be caused by the additional constraints imposed by the apriori assignment of overflow channels to active traffic channels. In particular, if k<n, blockage may occur even if the number of superactive channels is less than n, the number of overflow channels. If k<n, the above formula is a lower bound to the probability of blockage.

In order to simplify receiver design it is best to find apriori assignment strategies where k is small. Specifically, it is an objective of the present invention to provide an assignment strategy whereby when a call is set up it is pre-assigned (on each satellite downlink) one traffic channel and a set of k (n>k>1) overflow channels. The receiver for this call then knows that if the assigned traffic channel becomes superactive, the extra data will be carried on one of these k overflow channels. The choice of one of these k overflow channels to be coupled with the traffic channels is called post-assignment.

A first method of pre-assignment and post-assignment is illustrated by the following example. In the case of k=3 and n=6 each traffic channels is pre-assigned three of six overflow channels. The overflow channels are labeled by the letters A, B, C, D, E, and F. For the moment assume b=10 active traffic channels which are labelled by the symbols 0, 1, 2, 3, 4, 5, 6, 7, 8, and 9. In Table I, an exemplary assignment by which overflow channels are pre-assigned to these ten traffic channels is illustrated. In this table, the columns refer to overflow channels and the rows refer to traffic channels. The k=3 "1's" in a particular row indicate the k=3 overflow channels that have been assigned to that traffic channel. For example overflow channels A, B, and D have been assigned to traffic channel 0.

TABLE I

| ACTIVE TRAFFIC | OVERFLOW CHANNEL | | | | | |
|---|---|---|---|---|---|---|
| CHANNEL | A | B | C | D | E | F |
| 0 | 1 | 1 | 0 | 1 | 0 | 0 |
| 1 | 1 | 1 | 0 | 0 | 0 | 1 |
| 2 | 1 | 0 | 1 | 1 | 0 | 0 |
| 3 | 1 | 0 | 1 | 0 | 1 | 0 |
| 4 | 1 | 0 | 0 | 0 | 1 | 1 |
| 5 | 0 | 1 | 1 | 0 | 1 | 0 |
| 6 | 0 | 1 | 1 | 0 | 0 | 1 |
| 7 | 0 | 1 | 0 | 1 | 1 | 0 |
| 8 | 0 | 0 | 1 | 1 | 0 | 1 |
| 9 | 0 | 0 | 0 | 1 | 1 | 1 |

The "fairness" of this assignment is reflected in the fact that there are exactly r=5 traffic channels that are assigned to every overflow channel and exactly l=2 traffic channels that share the joint assignment of each pair of overhead channels. Methods by which this table and future tables are constructed are described later herein.

If six or fewer traffic channels become superactive, each of these superactive traffic channels can be assigned a unique overflow channel. For example, if the channels associated with traffic channels 0, 2, 3, 5, 8, 9 become superactive Table I would allow the post-assignment of traffic channel to overflow channel to be (0,A), (2,C), (3,E), (5,B), (8,D) and (9,F). However, if the channels associated with traffic channels 0, 1, 3, 5, 8, 9 become superactive Table I would allow the post-assignment (0,A), (1,B), (3,C), (5,E), (8,D) and (9,F). Note that in this example the post-assignment for superactive channel 3 was changed even though it was superactive in both sets.

In summary, for the pre-assignment described in Table I, there will be no blockage unless, the number of superactive channels exceeds the number of overflow channels. Thus in this way this assignment works as well as the completely dynamic assignment strategy and the previously given formula for blockage applies in this case. Yet the receiver is simpler since only one of three possible overflow channels can be coupled with any particular traffic channel.

Where each active traffic channel is assigned three of six overflow channels, there is no case where pre-assignment of overflow channels to active traffic channels that would allow for more than ten active traffic channels and yet have no blockage with six superactive channels. In illustration, the case where each active channel is pre-assigned k of n overflow channels is considered. An upper bound to the number of active channels b such that no overflow will occur if n or fewer active channels are superactive is sought. For any assignment table with b rows, n columns and k 1's per row there will be a total of (kb) 1's and ((n−k)b) 0's in the entire table. Thus the average number of 0's per column is then ((n−k)b)/n. For no blockage with n superactive channels, the maximum number of 0's in any column is (n−1). Since the maximum must be greater than or equal to the average, ((n−k)b)/n<(n−1). Solving for b leads to the following upper bound:

$$b \leq n(n-1)/(n-k). \quad (4)$$

More generally, through similar argument, that if there is to be no overflow or if fewer active channels are superactive for $0 \leq a \leq n-k-1$, then b must satisfy the inequality $$b \leq \frac{v!(v-k-a-1)!}{(v-a-2)!(v-k)!} \quad (5)$$

Returning to the case of a=0, or k=3 equation 5 becomes $$b \leq n(n-1)/(n-3). \quad (6)$$

It should be noted that for the special case of n=6, the right hand side of equation 6 is equal to the integer 10. Thus, the mapping given in Table I has a value of b=10 which is equal to this upper bound. Interestingly, the right hand side of equation 6 is also an integer for the case of n=9 yielding the upper bound b<12. An assignment with n=9 overflow channels that appears to allow any nine of twelve active traffic channels to become superactive without any blockage is given below in Table 2.

TABLE II

| ACTIVE TRAFFIC CHANNEL | OVERFLOW CHANNEL | | | | | | | | |
|---|---|---|---|---|---|---|---|---|---|
| | A | B | C | D | E | F | G | H | I |
| 0 | 1 | 1 | 1 | 0 | 0 | 0 | 0 | 0 | 0 |
| 1 | 1 | 0 | 0 | 1 | 1 | 0 | 0 | 0 | 0 |
| 2 | 1 | 0 | 0 | 0 | 0 | 1 | 0 | 1 | 0 |
| 3 | 1 | 0 | 0 | 0 | 0 | 0 | 1 | 0 | 1 |
| 4 | 0 | 1 | 0 | 1 | 0 | 0 | 0 | 0 | 1 |
| 5 | 0 | 1 | 0 | 0 | 1 | 1 | 0 | 0 | 0 |
| 6 | 0 | 1 | 0 | 0 | 0 | 0 | 1 | 1 | 0 |
| 7 | 0 | 0 | 1 | 1 | 0 | 0 | 0 | 1 | 0 |
| 8 | 0 | 0 | 1 | 0 | 1 | 0 | 1 | 0 | 0 |
| 9 | 0 | 0 | 1 | 0 | 0 | 1 | 0 | 0 | 1 |
| 10 | 0 | 0 | 0 | 1 | 0 | 1 | 1 | 0 | 0 |
| 11 | 0 | 0 | 0 | 0 | 1 | 0 | 0 | 1 | 1 |

Now returning to the case of n=6 overflow channels, assume that it is desirable to accommodate twice the number of active traffic channels, that is b=20 active traffic channels. If it is required to accomplish b=20 without increasing the number of overflow channels, the pre-assignment shown in Table III can be used. It should be noted that the assignment for the first ten channels is the same as in Table I so this assignment can be referred to as a nested strategy. A nested strategy may be used to generate a table for a greater number of traffic channels. In doing so, one begins with a pre-assignment table for a certain number of active traffic channels is generated and then more active traffic channels are added without changing the pre-assignment for the original set.

TABLE III

| ACTIVE TRAFFIC CHANNEL | OVERFLOW CHANNEL | | | | | |
|---|---|---|---|---|---|---|
| | A | B | C | D | E | F |
| 0 | 1 | 1 | 0 | 1 | 0 | 0 |
| 1 | 1 | 1 | 0 | 0 | 0 | 1 |
| 2 | 1 | 0 | 1 | 1 | 0 | 0 |
| 3 | 1 | 0 | 1 | 0 | 1 | 0 |
| 4 | 1 | 0 | 0 | 0 | 1 | 1 |
| 5 | 0 | 1 | 1 | 0 | 1 | 0 |

TABLE III-continued

| ACTIVE TRAFFIC CHANNEL | OVERFLOW CHANNEL | | | | | |
|---|---|---|---|---|---|---|
| | A | B | C | D | E | F |
| 6 | 0 | 1 | 1 | 0 | 0 | 1 |
| 7 | 0 | 1 | 0 | 1 | 1 | 0 |
| 8 | 0 | 0 | 1 | 1 | 0 | 1 |
| 9 | 0 | 0 | 0 | 1 | 1 | 1 |
| 10 | 1 | 1 | 1 | 0 | 0 | 0 |
| 11 | 1 | 1 | 0 | 0 | 1 | 0 |
| 12 | 1 | 0 | 1 | 0 | 0 | 1 |
| 13 | 1 | 0 | 0 | 1 | 1 | 0 |
| 14 | 1 | 0 | 0 | 1 | 0 | 1 |
| 15 | 0 | 1 | 1 | 1 | 0 | 0 |
| 16 | 0 | 1 | 0 | 1 | 0 | 1 |
| 17 | 0 | 1 | 0 | 0 | 1 | 1 |
| 18 | 0 | 0 | 1 | 0 | 1 | 1 |
| 19 | 0 | 0 | 1 | 1 | 1 | 0 |

The "fairness" of the pre-assignment given in Table III is reflected in the fact that now there are exactly r=10 traffic channels are assigned to every overflow channel and there are exactly l=4 traffic channels that share the joint assignment of each pair of overhead channels.

However in this case, this new assignment cannot accommodate any set of six superactive channels. For example, if the channels assigned to the active traffic channels 9, 15, 16, 17, 18, and 19 are superactive they cannot be assigned unique overflow channels since none of the active traffic channels has been pre-assigned overflow channel A. That is, at most five overflow channels are available to these six superactive channels. The proportion of cases of six superactive channels that cannot be accommodated by this assignment is:

$$\frac{6(C_6^{10})}{C_6^{20}} = .0325$$

where $C^t_s$ indicates the number of combinations of t things taken s at a time. It is true, however, that this new assignment will accommodate any set of five or fewer superactive channels.

As discussed above, one method to accommodate more active traffic channels is to soften the requirement regarding blockage. Another method is to increase the number of overflow channels. The present invention describes methods by which both approaches are followed.

A simple method of accommodating twenty active traffic channels in a manner such that no blockage will occur if six or fewer active traffic channels becomes superactive is to use twelve overflow channels and use an assignment as in Table I to assign the first ten traffic channels to the first six overflow channels and then to use this same assignment to assign the last ten traffic channels to the last six overflow channels. This is another example of a nested strategy.

Several methods exist to post-assign overflow channels to superactive traffic channels consistent with a given pre-assignment table. Returning to the design of the pre-assignment tables, an assignment table for n overflow channels is called full if its rows consist of all vectors with exactly k 1's. An example of such a full assignment table is given in Table I for the case of 6 overflow channels. From the above, a full assignment table will accommodate $b=C_k^v$ active channels. The number of active channels that can be accommodated by a full assignment table with n overflow channels is given in Table IV.

TABLE IV

Parameters for Full Assignment Table (k = 3)

| Number of overflow channels, n | 6 | 7 | 8 | 9 | 10 |
|---|---|---|---|---|---|
| Number of active channels, b | 20 | 35 | 56 | 84 | 120 |

Since there are a total of 128 channels available in a Globalstar system, if a full assignment table were used, 118 active traffic channels with ten overflow channels could be accomodated.

For a full assignment table every set of i overflow channels is assigned to exactly $C_{k-i}^{v-i}$ active traffic channels for i=1, 2, ..., k. For example, for the case of k=3, a full assignment table has the properties:

1. Every overflow channel is assigned to exactly $C_2^{v-1}$ active traffic channels.
2. Every pair of overflow channels is assigned to exactly $C_1^{v-2}$=v-1 active traffic channels.
3. Every triplet of overflow channels is assigned to exactly $C_0^{v-3}$=1 active traffic channels.

Similarly, for a full assignment table, for every set of i overflow channels where i=1, 2, ..., n-k, there are exactly $C_k^{v-i}$ active traffic channels that are not assigned to any of the overflow channels in the set. For example, for the full assignment table of Table II with n=6 and k=3, 1. Every single overflow channel is not assigned to $C_3^{6-1}$=10 active traffic channels.
2. Every pair of overflow channels has $C_3^{6-2}$=4 active traffic channels that are not assigned to either of the overflow channels in that pair.
3. Every triplet of overflow channels has $C_3^{6-3}$=1 active traffic channel that are not assigned to any of the overflow channels in that triplet.

If the blockage probability for a full assignment is too high, rows from the full assignment table can be eliminated. The result is an assignment table which can accommodate fewer active traffic channels but has better blockage performance. The process of eliminating still further rows can be repeated to arrive at another table, again which can accommodate even fewer active traffic channels but has even better blockage performance. These tables are considered to be nested in that the rows of a smaller table in this set of tables will be a subset of the rows in a larger table in this list of tables.

A set of nested assignment tables are convenient for various applications. When the traffic is light, the smallest assignment table in this set which will accommodate the number of active traffic channels is used. When the traffic increases to the point where the number of active traffic channels exceeds the maximum number for the assignment table in question, a new assignment table in the nested set of tables is adopted, which can accommodate the larger number of active traffic channels but which allows the present calls to retain their original overflow channel assignment. If non-nested tables were used, the assignment of overflow channels might have to be changed for a call in the middle of a call.

General methods for designing pre-assignment tables are now disclosed, although readily derivable alternative techniques exist. The method considered here employs the theory of balanced incomplete block designs for designing these tables. In the terminology of block designs, the overflow channels are called objects and the active traffic channels are called blocks. A block design is an arrangement of n objects into b blocks subject to certain rules concerning the occurrence of objects and pairs of objects. A balanced incomplete block design with parameters (b, n, r, k, l) is a block design such that:

1. Each block contains the same number, k, of objects.
2. Each object occurs in the same number, r, of blocks.
3. Each pair of distinct objects occurs in the same number, l, of blocks.

An assignment table based upon a balanced incomplete block design is a b row by n column matrix of 0's and 1's with a 1 in the i-th row and j-th column if and only if the j-th object occurs in the i-th block. There are two relations on the five parameters that are easily verified:

$$bk=nr, \text{ and} \qquad (7)$$

$$r(k-1)=l(n-1). \qquad (8)$$

Equation 7 results by counting the number of 1's in an assignment table first by rows and then by columns. Equation 8 results by counting pairs of 1's in the rows of an assignment table, first by noting that in any column there are r 1's and each can be paired with k-1 other 1's and alternatively that the 1's in any column match the 1's in any of the (n−1) other columns in exactly l places.

The special case of k=3 has received special attention and a balanced incomplete block design with k=3 is called a triple system. Note that a triple system corresponds to an assignment table where each active traffic channel is assigned exactly k=3 overflow channels. For a triple system, the above equations can be restated as:

$$r=l(n-1)/2, \qquad (9)$$

and $$b=ln(n-1)/6 \qquad (10)$$

Thus necessary conditions for a triple system to exist are:

$$l(n-1)\equiv 0 \text{ modulo } 2 \qquad (11)$$

$$ln(n-1)\equiv 0 \text{ modulo } 6 \qquad (12)$$

These latter two congruences are both necessary and sufficient for the existence of a (n, b, r, k=3, l) triple system.

It should be noted that for all values of n≦3, the full assignment table for k=3 yields a triple system with $b=C_3^v$ and l=(n−2). Furthermore, all assignment tables based upon any triple system must be nested within one of these designs.

The special case of a triple system when l=1 is called a Steiner triple system. For a Steiner triple system, the above congruences reduce to: n≡1 or 3 modulo 6 so that not all values of n can be utilized for Steiner systems.

The methods for constructing block designs fall into two broad categories: recursive and direct. The recursive method is a way of constructing designs from smaller ones while the direct method allows for the construction for special values of the parameters. Most of the direct methods make use of special properties of finite fields or congruences. An example of the direct method is an assignment table based upon a (b=35, n=15, r=7, k=3, l=1) design constructed from difference sets given below in Table V.

TABLE V

| ACTIVE TRAFFIC | OVERFLOW CHANNEL | | | | | | | | | | | | | | |
|---|---|---|---|---|---|---|---|---|---|---|---|---|---|---|---|
| CHANNEL | A | B | C | D | E | F | G | H | I | J | K | L | M | N | O |
| 0 | 1 | 1 | 0 | 0 | 1 | 0 | 0 | 0 | 0 | 0 | 0 | 0 | 0 | 0 | 0 |
| 1 | 0 | 1 | 1 | 0 | 0 | 1 | 0 | 0 | 0 | 0 | 0 | 0 | 0 | 0 | 0 |
| 2 | 0 | 0 | 1 | 1 | 0 | 0 | 1 | 0 | 0 | 0 | 0 | 0 | 0 | 0 | 0 |
| 3 | 0 | 0 | 0 | 1 | 1 | 0 | 0 | 1 | 0 | 0 | 0 | 0 | 0 | 0 | 0 |
| 4 | 0 | 0 | 0 | 0 | 1 | 1 | 0 | 0 | 1 | 0 | 0 | 0 | 0 | 0 | 0 |
| 5 | 0 | 0 | 0 | 0 | 0 | 1 | 1 | 0 | 0 | 1 | 0 | 0 | 0 | 0 | 0 |
| 6 | 0 | 0 | 0 | 0 | 0 | 0 | 1 | 1 | 0 | 0 | 1 | 0 | 0 | 0 | 0 |
| 7 | 0 | 0 | 0 | 0 | 0 | 0 | 0 | 1 | 1 | 0 | 0 | 1 | 0 | 0 | 0 |
| 8 | 0 | 0 | 0 | 0 | 0 | 0 | 0 | 0 | 1 | 1 | 0 | 0 | 1 | 0 | 0 |
| 9 | 0 | 0 | 0 | 0 | 0 | 0 | 0 | 0 | 0 | 1 | 1 | 0 | 0 | 1 | 0 |
| 10 | 0 | 0 | 0 | 0 | 0 | 0 | 0 | 0 | 0 | 0 | 1 | 1 | 0 | 0 | 1 |
| 11 | 1 | 0 | 0 | 0 | 0 | 0 | 0 | 0 | 0 | 0 | 0 | 1 | 1 | 0 | 0 |
| 12 | 0 | 1 | 0 | 0 | 0 | 0 | 0 | 0 | 0 | 0 | 0 | 0 | 1 | 1 | 0 |
| 13 | 0 | 0 | 1 | 0 | 0 | 0 | 0 | 0 | 0 | 0 | 0 | 0 | 0 | 1 | 1 |
| 14 | 1 | 0 | 0 | 1 | 0 | 0 | 0 | 0 | 0 | 0 | 0 | 0 | 0 | 0 | 1 |
| 15 | 1 | 0 | 0 | 0 | 0 | 0 | 0 | 1 | 0 | 0 | 0 | 0 | 0 | 1 | 0 |
| 16 | 0 | 1 | 0 | 0 | 0 | 0 | 0 | 1 | 0 | 0 | 0 | 0 | 0 | 0 | 1 |
| 17 | 1 | 0 | 1 | 0 | 0 | 0 | 0 | 0 | 0 | 1 | 0 | 0 | 0 | 0 | 0 |
| 18 | 0 | 1 | 0 | 1 | 0 | 0 | 0 | 0 | 0 | 0 | 1 | 0 | 0 | 0 | 0 |
| 19 | 0 | 0 | 1 | 0 | 1 | 0 | 0 | 0 | 0 | 0 | 0 | 1 | 0 | 0 | 0 |
| 20 | 0 | 0 | 0 | 1 | 0 | 1 | 0 | 0 | 0 | 0 | 0 | 0 | 1 | 0 | 0 |
| 21 | 0 | 0 | 0 | 0 | 1 | 0 | 1 | 0 | 0 | 0 | 0 | 0 | 0 | 1 | 0 |
| 22 | 0 | 0 | 0 | 0 | 0 | 1 | 0 | 1 | 0 | 0 | 0 | 0 | 0 | 0 | 1 |
| 23 | 1 | 0 | 0 | 0 | 0 | 0 | 1 | 0 | 1 | 0 | 0 | 0 | 0 | 0 | 0 |
| 24 | 0 | 1 | 0 | 0 | 0 | 0 | 0 | 1 | 0 | 1 | 0 | 0 | 0 | 0 | 0 |
| 25 | 0 | 0 | 1 | 0 | 0 | 0 | 0 | 0 | 1 | 0 | 1 | 0 | 0 | 0 | 0 |
| 26 | 0 | 0 | 0 | 1 | 0 | 0 | 0 | 0 | 0 | 1 | 0 | 1 | 0 | 0 | 0 |
| 27 | 0 | 0 | 0 | 0 | 1 | 0 | 0 | 0 | 0 | 0 | 1 | 0 | 1 | 0 | 0 |
| 28 | 0 | 0 | 0 | 0 | 0 | 1 | 0 | 0 | 0 | 0 | 0 | 1 | 0 | 1 | 0 |
| 29 | 0 | 0 | 0 | 0 | 0 | 0 | 1 | 0 | 0 | 0 | 0 | 0 | 1 | 0 | 1 |
| 30 | 1 | 0 | 0 | 0 | 0 | 1 | 0 | 0 | 0 | 0 | 1 | 0 | 0 | 0 | 0 |
| 31 | 0 | 1 | 0 | 0 | 0 | 0 | 1 | 0 | 0 | 0 | 0 | 1 | 0 | 0 | 0 |
| 32 | 0 | 0 | 1 | 0 | 0 | 0 | 0 | 1 | 0 | 0 | 0 | 0 | 1 | 0 | 0 |
| 33 | 0 | 0 | 0 | 1 | 0 | 0 | 0 | 0 | 1 | 0 | 0 | 0 | 0 | 1 | 0 |
| 34 | 0 | 0 | 0 | 0 | 1 | 0 | 0 | 0 | 0 | 1 | 0 | 0 | 0 | 0 | 1 |

Referring to Table 5, rows 2 through 14 are cyclic permutations of row 1; rows 16 through 29 are cyclic permutations of row 15; and rows 31 through 34 are cyclic permutations of row 30.

The following is a method for estimating the probability of blockage, for a superactive traffic channel, for the pre-assignment and post-assignment methods described above. A particular superactive traffic channel is blocked where that the particular superactive traffic channel cannot be assigned an overflow channel in the post-assignment process. Assume that there are b active traffic channels, n overflow channels and that each active traffic channel is pre-assigned k (of the n) overflow channels. Let $A_j$ be the event that exactly j, $0 \leq j \leq b$, of the b traffic sub channels are superactive and assume that the statistics describing this event are binomial: i.e., $$Pr\{A_j\} = \left(\frac{b!}{(b-j)!j!}\right) p^j (1-p)^{b-j}, 0 < p < 1, \quad (13)$$

where $$\left(\frac{b!}{(b-j)!j!}\right)$$

denotes the binomial coefficient "b choose j".

$B_i$ is defined as the event that the particular superactive traffic channel we are interested in is the i-th superactive traffic channel to be assigned in the post-assignment process. Assuming that given that there are j superactive traffic channels to be assigned, that the one of interest is equally likely to have "any place in line" (from 1 to j) in the post-assignment process. Mathematically, this can be stated as:

$$Pr\{B_i|A_j\}=1/j, i=1, 2, \ldots, j. \quad (14)$$

Finally, a simplifying assumption about the pre-assignment table may be made. It is assumed that the pre-assignment is such that when a post-assignment is to be made for any superactive traffic channel it is equally likely to be assigned to any of the n overflow channels. One case where this assumption would be valid is when the rows of the pre-assignment table are chosen randomly and with equal probability (from the $$\left(\frac{v!}{(v-k)!k!}\right)$$

possible ways of choosing rows with k 1's and (n–k) 0's). It should be noted that certain balanced deterministic assignments could also lead to this condition.

Under these assumptions, the probability of blockage, denoted $\tilde{P}r\{blockage\}$, for any particular superactive traffic channel may be calculated. This calculation is performed by conditioning on the events $A_j$ and $B_i$ and then by averaging over these events. That is $$\tilde{Pr}\{\text{blockage}\} = \sum_{j=1}^{b} \sum_{i=1}^{j} \tilde{Pr}\{\text{blockage}| A_j, B_i\} Pr\{B_i | A_j\} Pr\{A_j\} \quad (15)$$

or $$\tilde{Pr}\{\text{blockage}\} = \qquad (16)$$

$$\sum_{j=1}^{b} \sum_{i=1}^{j} \tilde{Pr}\{\text{blockage}| B_i\}(1/j)\left(\frac{b!}{(b-j)!j!}\right)p^j(1-p)^{b-j}$$

where use has been made of the fact that $Pr\{\text{blockage}|A_j, B_i\} = Pr\{\text{blockage}|B_i\}$.

Figure 9:
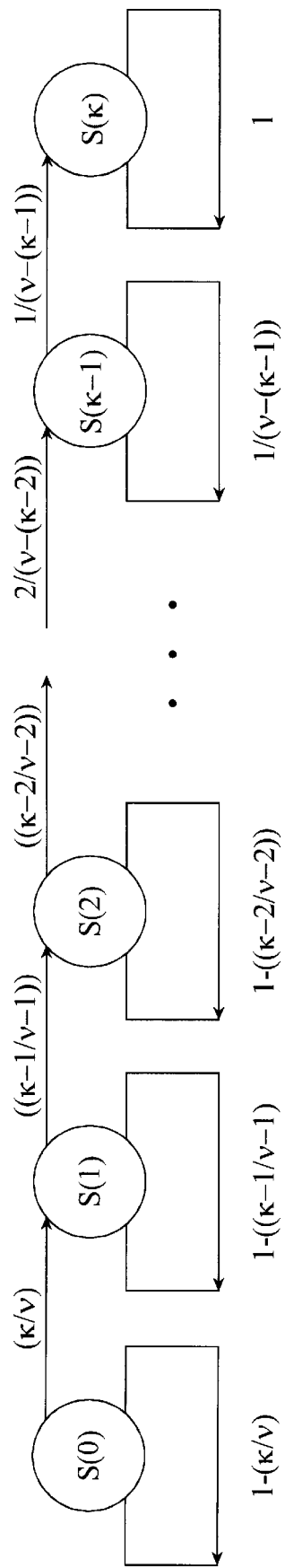
FIG. 9 illustrates a state diagram which relates to the case where the superactive traffic channel is the $i^{th}$ to be post-assigned.

Consider the state diagram shown in FIG. 9 which relates to the case where the superactive traffic channel in question is the i-th in line to be post-assigned. The branches are labeled with probabilities and the index of the states refers to how many of the overflow sub channels of the superactive traffic sub channel in question has been used up by post-assigning them to other superactive traffic channels which are ahead of it in the post-assignment process.

Assuming that i>1, and starting in state S(0) and post-assign the first superactive traffic sub channel is post assigned. With probability (k/n) it is assigned one of the k overflow channels of the superactive traffic channel in question and with probability 1-(k/n) it is not assigned one of the overflow channels. In the former case it is in state S(1) where the "1" indicates that 1 of the k overflow channels of our superactive traffic channel has already been assigned while in the latter case it remains in state S(0). Assuming that i>2, the process then moves on to post-assign the next superactive traffic channel. We continue in this fashion until all i-1 superactive traffic channels which are ahead of the one in question are post-assigned.

The probability in question, $\tilde{Pr}\{\text{blockage}|B_i\}$, is given by the conditional probability:

$$\tilde{Pr}\{\text{blockage}|B_i\} = Pr\{\text{state}=S(k) \text{ at time } i-1 | \text{state}=S(0) \text{ at time } 0\}. \quad (17)$$

The probability of equation 17 can be obtained by a generator function approach by additionally labeling each forward path by Z I and each path which does not progress forward by Z. The generator function T(Z,I) can be written as:

$$T(Z, I) = \prod_{r=0}^{k-1} \frac{\left(\frac{k-r}{v-r}\right) \cdot Z \cdot I}{1 - \left(1 - \left(\frac{k-r}{v-r}\right)\right) \cdot Z} = \sum_{r=0}^{k-1} \sum_{w=0} \backslash(\backslash\% \backslash) C(r, w) \cdot I^r \cdot Z^w \quad (18)$$

The probability of blockage is then given as:

$$Pr(\text{blockage}) = \qquad (19)$$

$$\sum_{j=1}^{k} \frac{1}{j} \cdot \left(\frac{b!}{(b-j)!j!}\right) \cdot p^j \cdot (1-p)^{b-j} \cdot \sum_{i=1}^{j} C(i-1, k-1)$$

which can be computed.

The previous description of the preferred embodiments is provided to enable any person skilled in the art to make or use the present invention. The various modifications to these embodiments will be readily apparent to those skilled in the art, and the generic principles defined herein may be applied to other embodiments without the use of the inventive faculty. Thus, the present invention is not intended to be limited to the embodiments shown herein but is to be accorded the widest scope consistent with the principles and novel features disclosed herein.

We claim:

1. An apparatus for transmitting a variable rate packet of data symbols comprising a variable number of said data symbols, said apparatus comprising:

channel packetizer means for receiving said variable rate packet and when the number of said data symbols exceeds a threshold value, splitting said variable rate packet into a traffic packet and at least one overflow packet;

transmission means for transmitting said variable rate packet on a traffic channel when in number of said data symbols is below said threshold value and for transmitting said traffic packet on said traffic channel and said at least one overflow packet on at least one overflow channel when the number of said data symbols exceeds said threshold value, wherein each of said at least one overflow channel is orthogonal to said traffic channel and wherein said at least one overflow channel is selected based on a statistical multiplexing of said at least one overflow channel.

2. The apparatus of claim 1 wherein said transmission means comprises:

modulator means for modulating said variable rate packet to provide said variable rate packet on said traffic channel in accordance with a first spread spectrum modulation format when the number of said data symbols is below said threshold value and for modulating said traffic packet to provide said traffic packet on said traffic channel in accordance with said first spread spectrum modulation format and for modulating said at least one overflow packet in accordance with a second spread spectrum modulation format to provide said at least one overflow packet on said at least one overflow channel when the number of said data symbols exceeds said threshold value wherein said first spread spectrum modulation format is orthogonal to said second spread spectrum modulation format; and RF means for upconverting and amplifying said variable rate packet when the number of said data symbols is below said threshold value and for upconverting and amplifying said traffic packet and said at least one overflow packet when the number of said data symbols exceeds said threshold value.

3. The apparatus of claim 1 further comprising overflow channel signaling means for transmitting a signal identifying said at least one overflow channel.

4. The apparatus of claim 1 wherein said channel packetizer means includes means for receiving a signal indicative of said at least one overflow channel and for combining said signal indicative of said at least one overflow channel and said traffic packet.

5. The apparatus of claim 1 wherein said channel packetizer means includes means for receiving a signal indicative of said at least one overflow channel for a subsequent variable rate packet and for combining a signal indicative of said at least one overflow channel for a subsequent variable rate packet and said traffic packet.

6. The apparatus of claim 1 further comprising variable rate vocoder means for receiving speech samples and for compressing said speech samples in accordance with a variable rate vocoder format to provide said variable rate packet.

7. The apparatus of claim 6 further comprising encoder means for error correction coding said variable rate packet disposed between said channel packetizer means and said transmission means.

8. The apparatus of claim 7 further comprising interleaver means for reordering said variable rate packet disposed between said encoder means and said transmission means.

9. The apparatus of claim 6 wherein said variable rate vocoder means is further for compressing said speech samples in accordance with a second variable rate vocoder format to provide an alternative variable rate packet and wherein said channel packetizer means is further for selecting a variable rate packet for transmission from said variable rate packet and said alternative variable rate packet.

10. The apparatus of claim 1 further comprising cell controller means for providing an overflow channel availability signal and where said channel packetizer means is responsive to said traffic channel availability signal.

11. A method for transmitting a variable rate packet of data symbols comprising a variable number of said data symbols, said method comprising the steps of:
  receiving said variable rate packet;
  splitting said variable rate packet into a traffic packet and at least one overflow packet, when the number of said data symbols exceeds a threshold value;
  transmitting said variable rate packet on a traffic channel when number of said data symbols is below said threshold value; and
  transmitting said traffic packet on said traffic channel and said at least one overflow packet on at least one overflow channel when the number of said data symbols exceeds said threshold value, wherein each of said at least one overflow channel is orthogonal to said traffic channel and wherein said at least one overflow channel is selected based on a statistical multiplexing of said at least one overflow channel.

12. The method of claim 11 wherein said step of transmitting said traffic packet on said traffic channel and said at least one overflow packet on at least one overflow channel comprises the steps of:
  modulating said traffic packet to provide said traffic packet on said traffic channel in accordance with said first spread spectrum modulation format;
  modulating said at least one overflow packet in accordance with a second spread spectrum modulation format to provide said at least one overflow packet on said at least one overflow channel wherein said first spread spectrum modulation format is orthogonal to said second spread spectrum modulation format;
  upconverting said traffic packet and said at least one overflow packet when the number of said data symbols exceeds said threshold value; and
  amplifying said traffic packet and said at least one overflow packet when the number of said data symbols exceeds said threshold value.

13. The method of claim 11 further transmitting a signal identifying of said at least overflow channel.

14. The method of claim 11 further comprising combining said signal indicative of said at least overflow channel with said traffic packet.

15. The method of claim 11 further comprising the step of combining a signal indicative of said at least overflow channel for a subsequent variable rate packet and said traffic packet.

16. The method of claim 11 further comprising the steps of:
  receiving speech samples; and
  compressing said speech samples in accordance with a variable rate vocoder format to provide said variable rate packet.

17. The method of claim 16 further comprising the step of error correction coding said variable rate packet.

18. The method of claim 17 further comprising the step of reordering said variable rate packet.

19. The method of claim 16 wherein said step of compressing said speech samples further comprises compressing said speech samples in accordance with a second variable rate vocoder format to provide an alternative variable rate packet.

20. The method of claim 11 further comprising the step of providing an overflow channel availability signal.

21. A system for transmitting a variable rate packet of data symbols comprising:
  an interleaver having an input and having a first output for outputting said variable rate packet when the number of said data symbols in said variable rate packet is less than a threshold and for outputting a first portion of said variable rate packet when the number of said data symbols in said packet is greater than said threshold and having a second output for outputting a second portion of said variable rate packet when the number of said data symbols in said variable rate packet is greater than said threshold;
  a first modulator having an input coupled to said first interleaver output and having an output; and
  a second modulator having an input coupled to said second interleaver output and having an output wherein said output of said second modulator is dependent on an availability of at least one overflow channel.

22. The system of claims 21 further comprising a variable data source having an input and having an output coupled to the interleaver.

23. The system of claim 22 further comprising a selector disposed between said variable rate data source and said interleaver having an input coupled to said variable rate data source output and having an output coupled to said interleaver input.

24. The system of claim 23 wherein said selector having a second input and said system further comprises a cell controller has an output coupled to said second selector input.

25. Apparatus for receiving a variable rate packet of data symbols in a communication system in which one or more base stations communicate with one or more mobile stations using spread spectrum communication signals in which variable rate data is placed on one of a plurality of orthogonal code channels which are also spread using at least one PN code and transferred from one station to another using a selected traffic code channel and one or more corresponding orthogonal overflow code channels within a spread communication signal, comprising:
  a traffic channel demodulator connected to receive and demodulate communication signals to produce demodulated traffic packets in accordance with a selected traffic channel code and modulation format to provide a demodulated traffic packet;
  at least one overflow demodulator connected to receive and demodulate communication signals to produce one or more demodulated overflow packets in accordance with selected overflow channel codes and modulation formats to provide at least one demodulated overflow packet which corresponds to said demodulated traffic packet; and
  at least one combiner coupled to said traffic and overflow demodulators for receiving and combining said demodulated traffic and overflow packets to produce a single variable rate packet in accordance with said statistical multiplexing of data packets onto overflow channels.

26. The apparatus of claim 25 further comprising decoder disposed between said traffic demodulator and said combiner for selecting a demodulated overflow packet of said at lest one demodulated overflow packet.

27. The apparatus of claim 26 wherein said decoder combines said demodulated traffic packet and each of said at least one demodulated overflow packet and decodes each combination to determine a selected overflow packet.

28. The apparatus of claim 27 wherein said decoder decodes said traffic packet to determine an overflow channel identification signal and wherein said at least one overflow demodulator is responsive to said overflow channel identification signal for selecting at least one overflow channel packet.

29. System for transferring variable rate data symbols in a communication system in which one or more base stations communicate with one or more mobile stations using direct sequence spread spectrum communication signals in which variable rate data is placed on one of a plurality of orthogonal code channels which are also spread using at least one PN code and transferred using a traffic code channel and one or more corresponding orthogonal overflow code channels within a FDM communication signal, comprising:

means for receiving variable rate data packets and dividing them into traffic and overflow channel packets when a number of data symbols in the variable rate packet exceeds a preselected amount;

transmission means for transmitting said variable rate packets on a traffic channel except when divided into traffic and overflow packets, and then for transmitting said traffic and overflow packets on a traffic and at least one corresponding overflow channel, respectively, selected based on statistical multiplexing of data packets, with said channels being orthogonal to each other according to preselected orthogonal codes used to modulate said channel data;

receiver means for receiving traffic and overflow channel signals;

a traffic channel demodulator connected to receive and demodulate channel signals to produce demodulated traffic packets in accordance with a selected traffic channel code and modulation format to provide a demodulated traffic packet;

at least one overflow demodulator connected to receive and demodulate channel signals to produce one or more demodulated overflow packets in accordance with selected overflow channel codes and modulation formats to provide at least one demodulated overflow packet which corresponds to said demodulated traffic packet; and at least one combiner coupled to said traffic and overflow demodulators for receiving and combining said demodulated traffic and overflow packets to produce a single variable rate packet in accordance with said statistical multiplexing of data packets onto overflow channels.

* * * * *